(12) United States Patent
Gardner et al.

(10) Patent No.: US 10,870,472 B2
(45) Date of Patent: Dec. 22, 2020

(54) DEPLOYABLE WINGSAIL FOR CONTAINER SHIPS

(71) Applicant: Wind + Wing Technologies, Inc., Napa, CA (US)

(72) Inventors: Jay Michael Gardner, Napa, CA (US); George Reginald Seyfang, Preston (GB)

(73) Assignee: Wind + Wing Technologies, Inc., Napa, CA (US)

( * ) Notice: Subject to any disclaimer, the term of this patent is extended or adjusted under 35 U.S.C. 154(b) by 0 days.

(21) Appl. No.: 16/392,459

(22) Filed: Apr. 23, 2019

(65) Prior Publication Data

US 2019/0248460 A1    Aug. 15, 2019

Related U.S. Application Data

(63) Continuation-in-part of application No. 15/593,111, filed on May 11, 2017, now Pat. No. 10,293,904.

(60) Provisional application No. 62/336,491, filed on May 13, 2016.

(51) Int. Cl.
*B63H 9/061* (2020.01)
*B63H 9/069* (2020.01)
*B63H 9/072* (2020.01)

(52) U.S. Cl.
CPC .............. *B63H 9/061* (2020.02); *B63H 9/069* (2020.02); *B63H 9/072* (2020.02)

(58) Field of Classification Search
CPC ......... B63B 9/061; B63B 9/069; B63B 9/072; B63B 9/06; B63H 9/061; B63H 9/069; B63H 9/072; B63H 9/06
See application file for complete search history.

(56) References Cited

U.S. PATENT DOCUMENTS

| 3,776,169 A | 12/1973 | Strecker |
| 5,622,131 A * | 4/1997 | Walker ................... B63H 9/061 114/102.29 |
| 7,461,609 B1 * | 12/2008 | Ott ......................... B63H 9/061 114/102.29 |
| 8,800,460 B2 | 8/2014 | Kosugi et al. |
| 9,003,986 B2 * | 4/2015 | Jenkins ................... B63B 71/20 114/39.23 |
| 2005/0252764 A1 | 11/2005 | Meller |
| 2011/0146751 A1 | 6/2011 | McGuire et al. |
| 2011/0315192 A1 | 12/2011 | Swatek et al. |
| 2012/0090520 A1 | 4/2012 | Kosugi et al. |

(Continued)

FOREIGN PATENT DOCUMENTS

| CN | 104909074 A | 9/2015 |
| DE | 156356 | 8/1982 |

(Continued)

OTHER PUBLICATIONS

European Office Action dated Oct. 1, 2019, from application No. 17726061.9.

(Continued)

*Primary Examiner* — Stephen P Avila

(74) *Attorney, Agent, or Firm* — Foley & Lardner LLP

(57) ABSTRACT

A wingsail includes a wing body, a wing axle having an axis, and at least one trim plate supported on a side surface of the wing body, the trim plate to control a rotational movement of the wing body about an axis of the wing axle.

23 Claims, 18 Drawing Sheets

(56) References Cited

U.S. PATENT DOCUMENTS

| | | |
|---|---|---|
| 2012/0145062 A1 | 6/2012 | Ott et al. |
| 2012/0292945 A1 | 11/2012 | Nusbaum |
| 2014/0116311 A1* | 5/2014 | Holemans ............... B63C 7/003 114/39.23 |
| 2014/0144362 A1 | 5/2014 | Atkinson |
| 2014/0174283 A1 | 6/2014 | Kempas |
| 2015/0266555 A1 | 9/2015 | Dane et al. |
| 2016/0036375 A1 | 2/2016 | Ansari |

FOREIGN PATENT DOCUMENTS

| | | |
|---|---|---|
| DE | 31 07 096 | 9/1982 |
| FR | 2382370 A1 | 9/1978 |
| GB | 2 098 950 A | 12/1982 |
| GB | 2 234 723 | 2/1991 |
| GB | 2 478 313 A | 9/2011 |
| JP | 57-178994 | 11/1982 |
| JP | 584696 | 1/1983 |
| JP | 2009-214673 A | 9/2009 |
| NZ | 618484 | 2/2014 |

OTHER PUBLICATIONS

International Preliminary Report on Patentability dated Jul. 6, 2018, from application No. PCT/US2017/032544.
International Search Report and Written Opinion dated Jul. 24, 2017, from application No. PCT/US2017/032544.
U.S. Final Office Action dated Oct. 25, 2018, from U.S. Appl. No. 15/593,111.
U.S. Non-Final Office Action dated Jun. 15, 2018, from U.S. Appl. No. 15/593,111.
U.S. Notice of Allowance dated Jan. 10, 2019, from U.S. Appl. No. 15/593,111.
Written Opinion dated Apr. 18, 2018, from application No. PCT/US2017/032544.
International Search Report and Written Opinion dated Jul. 21, 2020, from application No. PCT/US2020/028980.

* cited by examiner

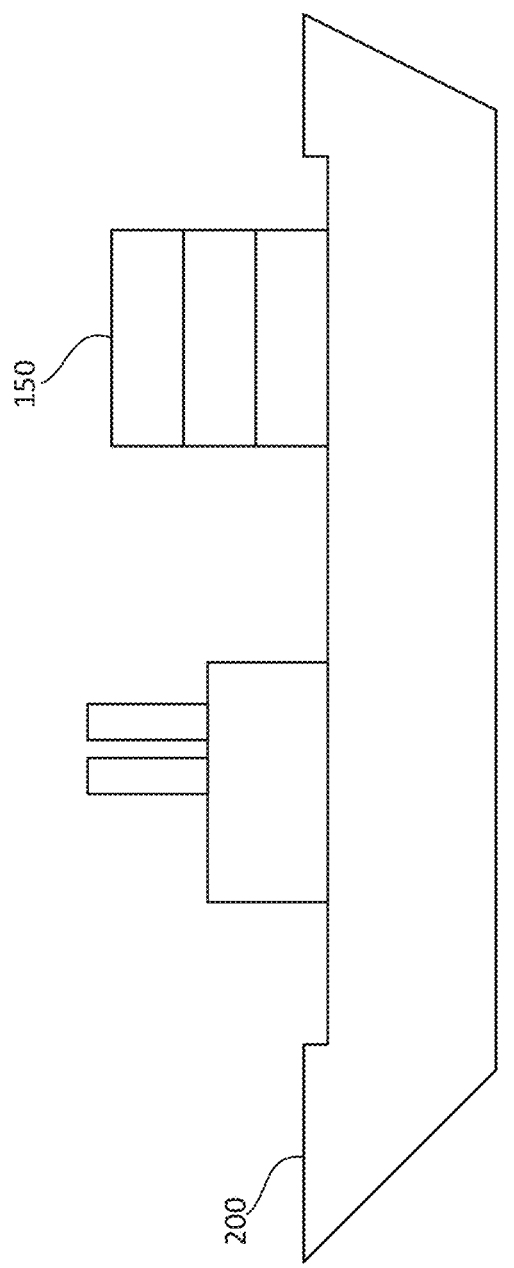

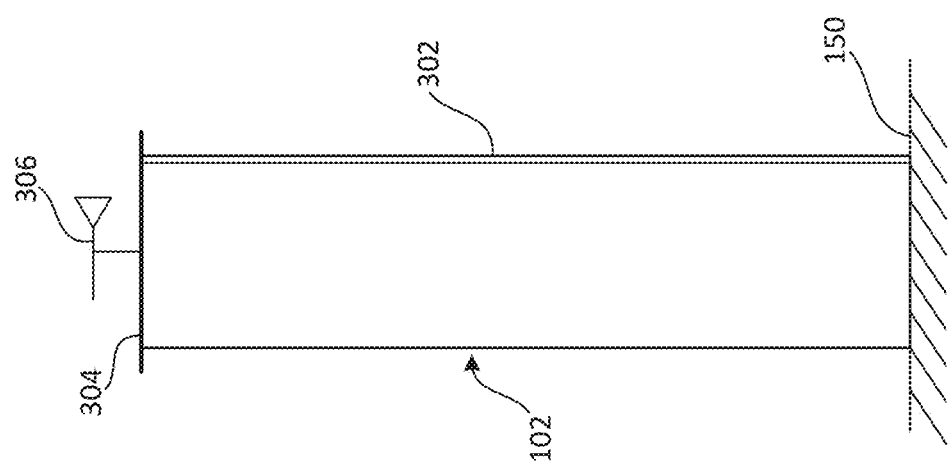

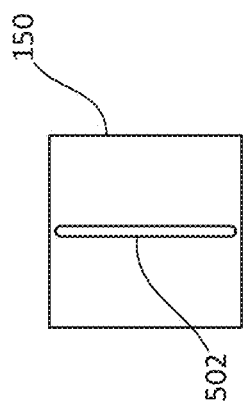
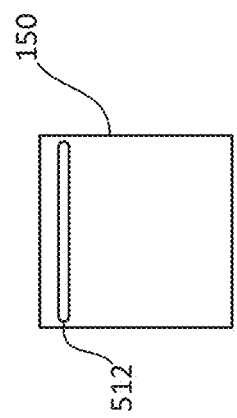
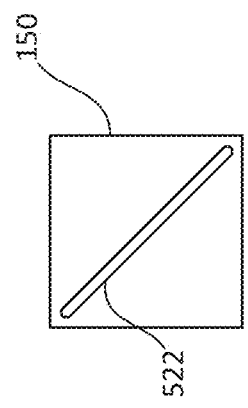
*FIG. 5A*
*FIG. 5B*
*FIG. 5C*
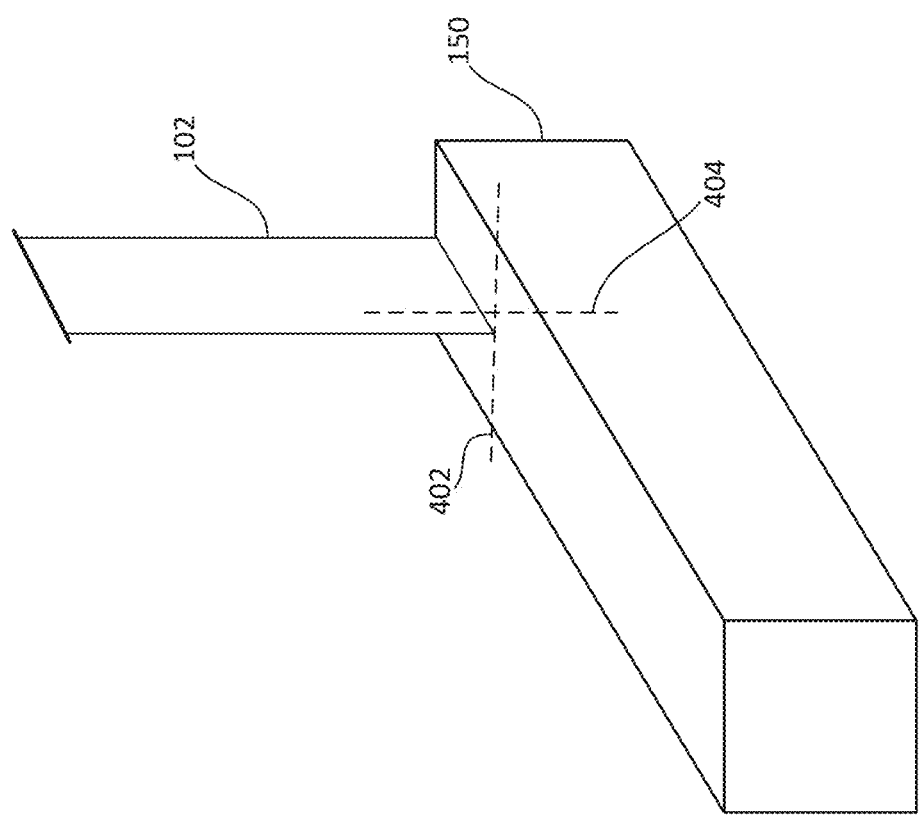
*FIG. 4*

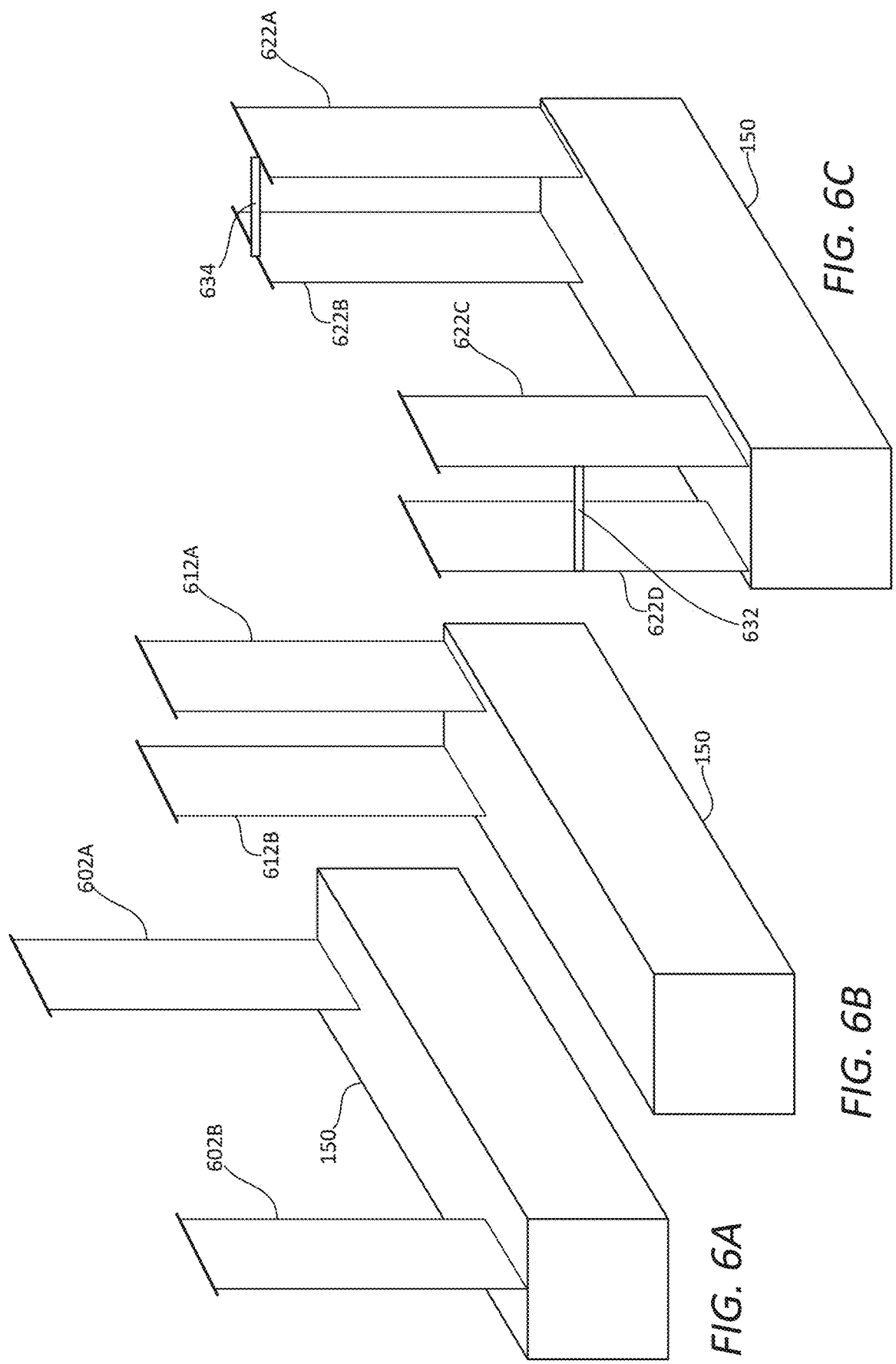

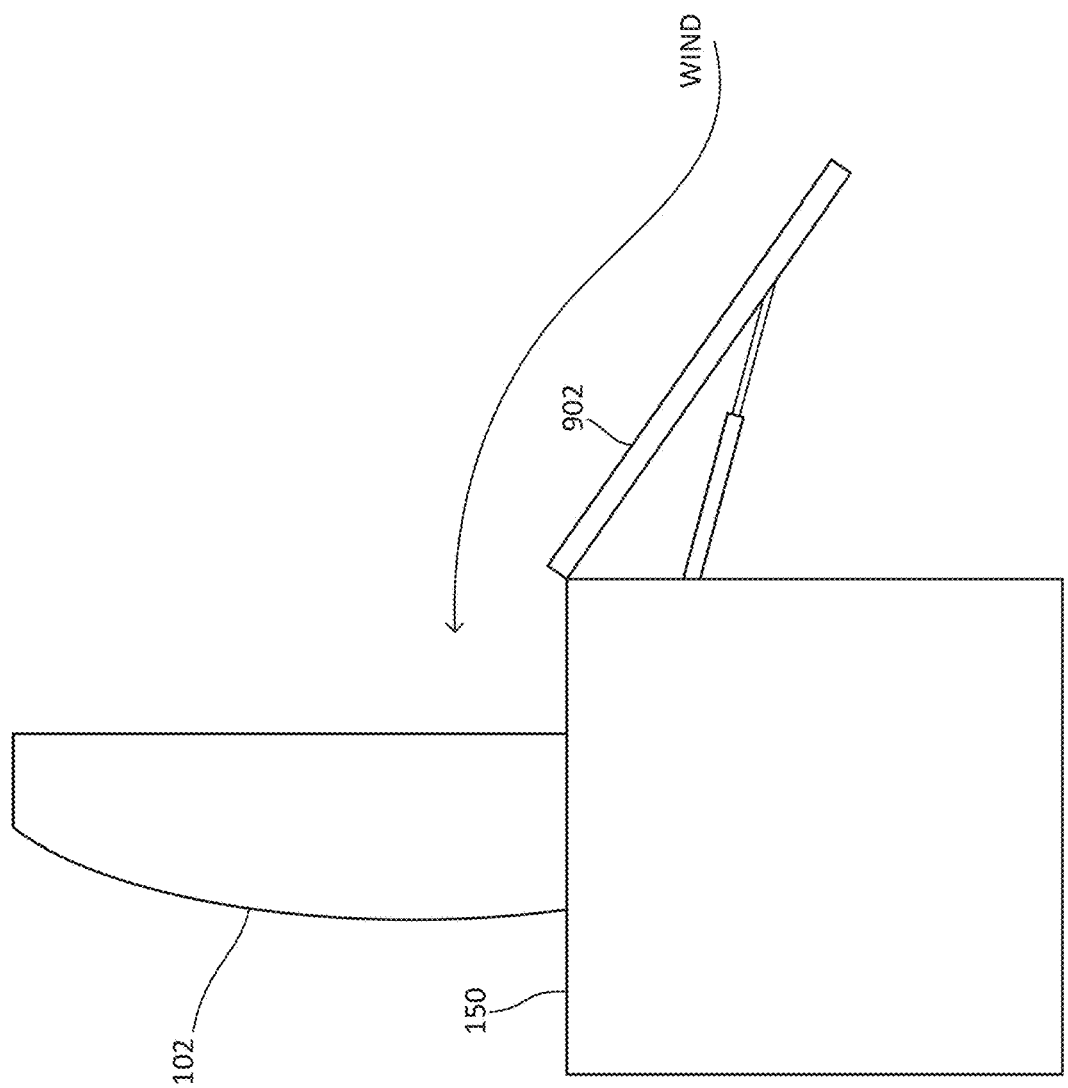
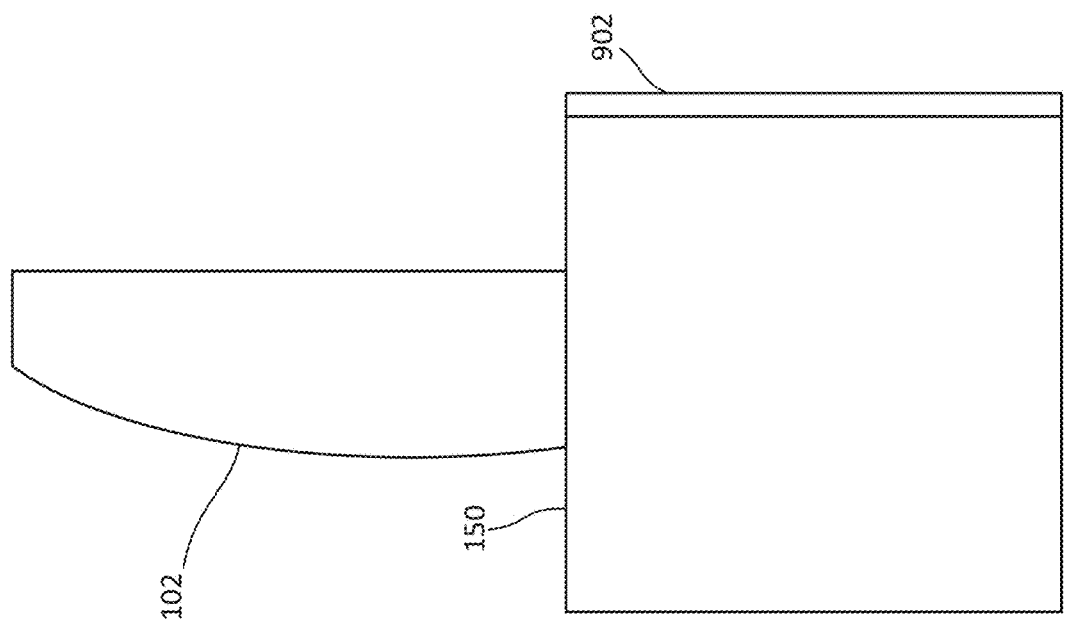
FIG. 9B
FIG. 9A

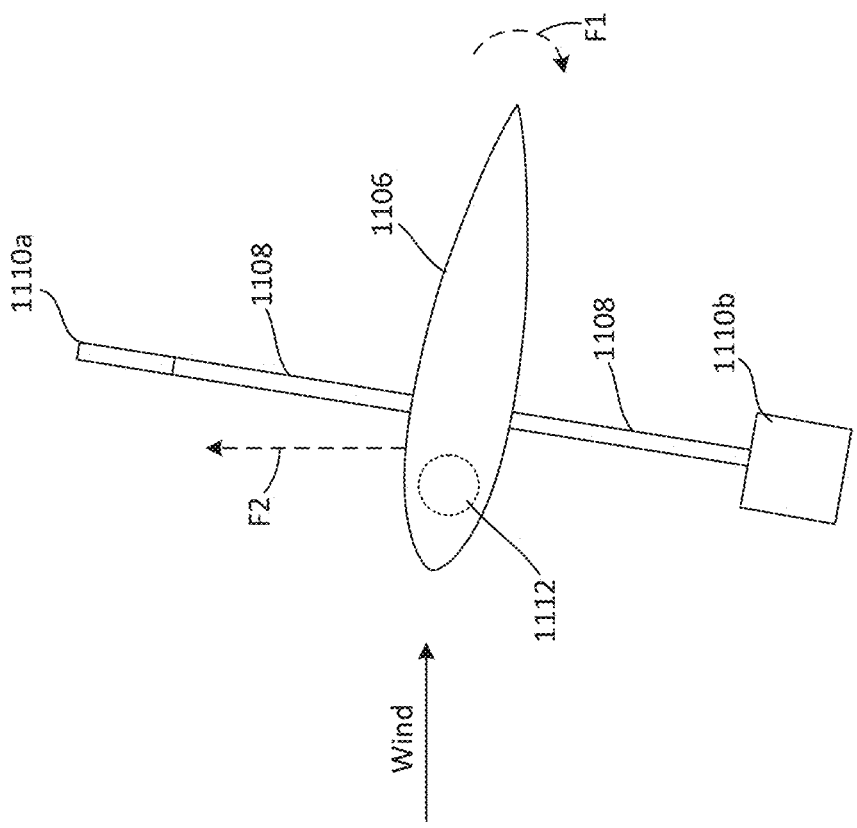
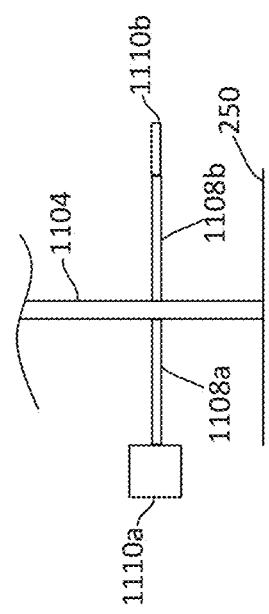
FIG. 13B
FIG. 13A

DEPLOYABLE WINGSAIL FOR CONTAINER SHIPS

CROSS-REFERENCE TO RELATED PATENT APPLICATIONS

This application is a continuation-in-part of U.S. patent application Ser. No. 15/593,111, filed on May 11, 2017, which claims priority to U.S. Provisional Application No. 62/336,491, filed on May 13, 2016, the disclosures of both of which are incorporated herein by reference in their entirety.

BACKGROUND

1. Field

Subject matter described herein relates generally to wind propulsion of cargo ships, and, in particular, to containers housing deployable wingsails.

2. Background

Throughout the world, cargo is transported across oceans and other waterways via ships carrying standard-sized cargo containers. During travel, the cargo ships expend much fuel, resulting in high costs and harmful criteria pollutants and Green House Gas (GHG) emissions. As such, due to the prevalence of cargo shipping, there is a great need to abate fuel consumption for ships carrying cargo, which would result in cost savings and a mitigation of deleterious environmental effects.

In addition to ocean and other waterway transportation of cargo, railroads also move large volumes of cargo. Rail freight cargo provides major transporting means to the bulk commodities and construction sectors due to the significant economies of scale. For example, rail freight cargo account for substantial transportation of coal, raw ores, and grain. However, much like transportation via waterway, railway transportation via railway entails expending significant amounts of fuel, resulting in emissions of harmful criteria pollutants and GHG. Accordingly, a way to reduce these cargo transportation-based emissions in a cost effective manner is desirable.

SUMMARY

In general, various embodiments relate to a wingsail (e.g., a wingsail that is housed within a shipping container and is configured to be deployed during transportation of the container) on a vessel or on a vehicle. Accordingly, the wingsail can provide supplemental wind-based propulsion while the vessel is at sea or while the vehicle is on land, decreasing propulsion requirements from fossil fuel-based engines, and thus, resulting in a decrease in environmental emissions associated with transporting cargo. Further embodiments relate to systems employing a plurality of wingsail-containing shipping containers that are mounted on a container vessel or vehicle and controlled for selective deploying individually, or in one or more different combinations (or all together), depending upon the wind and other environmental conditions.

According to an example embodiment, a wingsail includes a wing body, a wing axle having an axis, and at least one trim plate supported on a side surface of the wing body. The trim plate is configured to control a rotational movement of the wing body about the axis of the wing axle.

In some embodiments, the trim plate may be configured to transition between a first position and a second position to adjust an amount of wind force applied to the trim plate.

In some embodiments, the trim plate may be configured to rotate between the first position and the second position.

In some embodiments, the trim plate may include: a hinge; and a wind opposing surface configured to pivot about the hinge to transition between the first position and the second position.

In some embodiments, the wingsail may further include a shaft to support the trim plate on the side surface of the wing body.

In some embodiments, the shaft may extend the trim plate away from the side surface of the wing body.

In some embodiments, the shaft may extend perpendicularly from the side surface of the wing body.

In some embodiments, the shaft may be configured to telescopically extend to control a distance between the trim plate and the side surface of the wing body.

In some embodiments, the shaft may include a length, and the trim plate may be configured to slide along the length of the shaft to control a distance between the trim plate and the side surface of the wing body.

In some embodiments, a first trim plate may be supported on the side surface of the wing body and a second trim plate may be supported on an opposite side surface of the wing body.

In some embodiments, each of the first trim plate and the second trim plate may be configured to transition between a first position and a second position to control a steering force of the wing body about the wing axle.

In some embodiments, the steering force may trim a corresponding lift force to provide thrust in the direction of the lift force.

According to another embodiment, a method of steering a wingsail is provided. The wingsail includes a wing body, a wing axle having an axis, and at least one trim plate supported on a side surface of the wing body. The method includes installing a wingsail on a surface of a container or vessel, extending the trim plate into relative wind forces, and adjusting a position of the trim plate to control a rotational movement of the wing body about the axis of the wing axle.

In some embodiments, the adjusting of the position of the trim plate may include rotating the trim plate between a first position and a second position to control an amount of the relative wind forces applied to a wind opposing surface of the trim plate.

In some embodiments, the adjusting of the position of the trim plate may include pivoting a wind opposing surface of the trim plate about a hinge to open or close the wind opposing surface to the relative wind forces.

In some embodiments, the method may further include: providing a shaft on the side surface of the wing body; and attaching the trim plate to the shaft.

In some embodiments, the extending of the trim plate into relative wind forces may include: attaching the trim plate to an end of the shaft; and telescopically extending the shaft from the side surface of the wing body.

In some embodiments, the extending of the trim plate into relative wind forces may include sliding the trim plate along a length of the shaft.

In some embodiments, the trim plate may include a first trim plate supported on the side surface of the wing body, and a second trim plate supported on an opposite side surface of the wing body, and the method may further include adjusting a position of each of the first and second trim plates such that the first trim plate generates drag relative to the relative wind forces and the second trim plate does not generate drag relative to the relative wind forces. In some embodiments, in response, a steering force may be generated to rotate the wingsail about the wing axle in a direction toward the second trim plate.

In some embodiments, the steering force may trim a corresponding lift force to provide thrust in the direction of the lift force.

BRIEF DESCRIPTION OF THE DRAWINGS

FIG. 2A illustrates a side view of a ship carrying a wingsail container according to various embodiments.

FIG. 3A illustrates a side view of a wingsail according to various embodiments.

FIG. 3B illustrates a top view of a wingsail according to various embodiments.

FIG. 4 illustrates a perspective view of a wingsail deployed from a container according to various embodiments.

FIG. 5A, FIG. 5B, and FIG. 5C illustrate cross-sectional views of a container housing wingsails oriented differently according to various embodiments.

FIG. 6A, FIG. 6B, and FIG. 6C illustrate perspective views of various wingsail configurations deployed from a container according to various embodiments.

FIG. 9A and FIG. 9B illustrate a side view of a container including a wingsail and an air deflection panel according to various embodiments.

FIG. 13A shows a front sectional view of the wingsail of FIG. 11, according to various embodiments.

FIG. 13B shows a top view of the wingsail of FIG. 11, according to various embodiments.

DETAILED DESCRIPTION

Figure 1A:
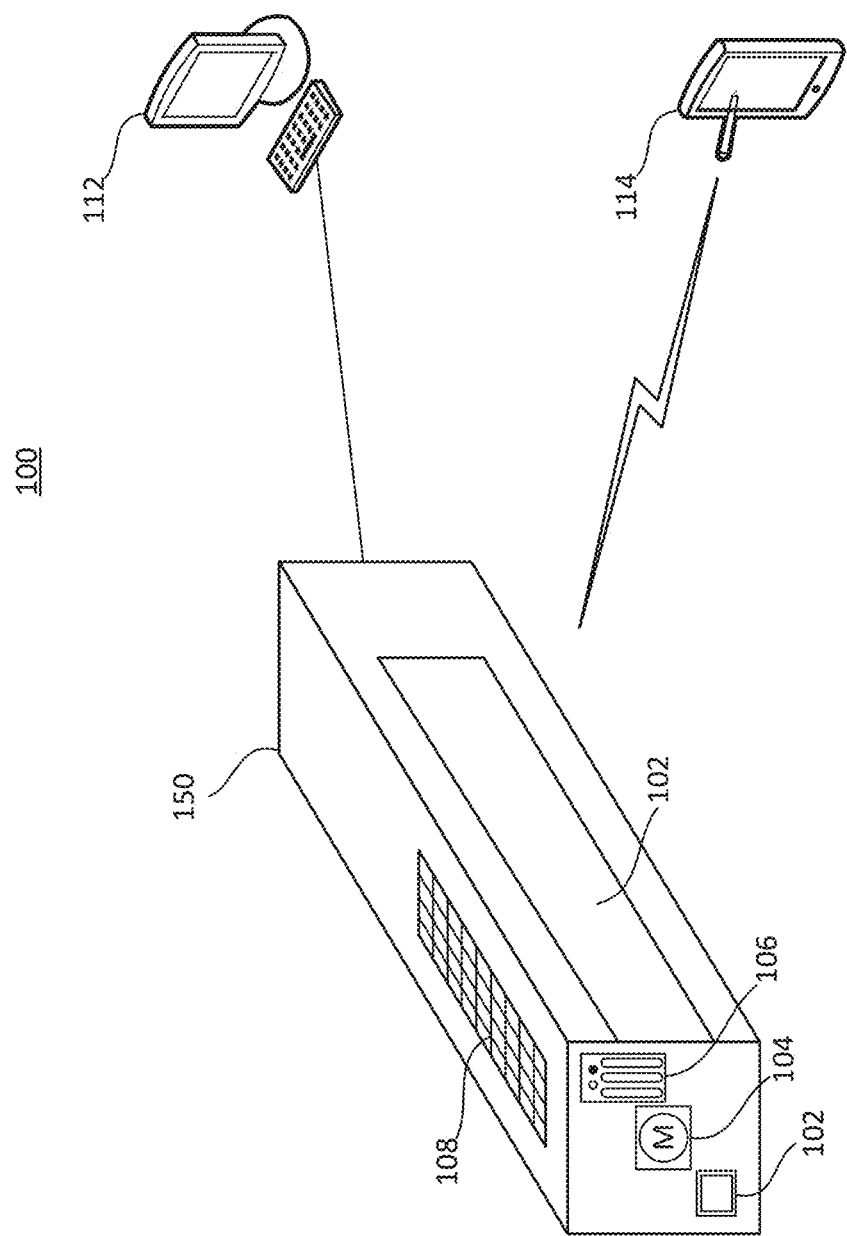
FIG. 1A illustrates a system including a wingsail housed in a container according to various embodiments.

The detailed description set forth below in connection with the appended drawings is intended as a description of various configurations and is not intended to represent the only configurations in which the concepts described herein may be practiced. The detailed description includes specific details for providing a thorough understanding of various concepts. However, it will be apparent to those skilled in the art that these concepts may be practiced without these specific details. In some instances, well-known structures and components are shown in block diagram form in order to avoid obscuring such concepts.

Various embodiments relate to wingsails, which are aerodynamic structures that can be configured similar to an airplane wing, but are supported vertically to create "lift" directed to propel a vehicle forward (e.g., a water vessel, a ground vehicle, and the like). In some embodiments, a wingsail is housed within a shipping container and configured to be deployed during transportation of the container on a vehicle (e.g., while a ship is at sea or while a railcar is transporting the container on land). When deployed, the wingsail extends from the container and can utilize wind to help propel the vehicle forward.

According to various embodiments, one or more wingsails are stowed within a standard-sized shipping container, along with mechanisms for selectively deploying the wingsail from the container, and re-stowing the wingsail within the container after use. One or more of such containers may be anchored onto the top layer of containers of a vessel (e.g., a typical container ship and using container anchors typically used on such ships for anchoring containers during transportation), or on a railcar (e.g., using container anchors typically used on such railcars for anchoring containers during transportation).

In some embodiments, when the vessel is at sea, the wingsails may be deployed (e.g., extended upwards from the container, while still mounted to and supported by the anchored container). Before the vessel enters a port, or in conditions where wingsails may not be required, the wingsails may be retracted and re-stowed in the containers. By employing standard-sized containers, different types of vessels or railcars can be fitted with such containers, and such containers can be moved from vessel-to-vessel or railcar-to-railcar, as needed.

In some embodiments, different types of vessels that float on water can be fitted with wingsail containers described herein, such as, but not limited to, ordinary cargo ships, freight ships, ships including one or more hulls, barges, catamarans, yachts, and other suitable vessels. Although, the present disclosure describes the wingsail container with respect to a container ship, any other suitable vessel may be used.

In some embodiments, the wingsail is configured to deploy from a container by lifting (or tilting) upward from a generally horizontal state to a generally vertical state. Alternatively, the wingsail may be configured to deploy in a telescoping manner, or by unfolding or expanding (e.g., accordion-like or inflatable). More than one wingsail may be stowed and deployed from a given container. One or more wingsails may be stowed in a container with the width or length dimension of the wingsail arranged diagonally, to allow for maximizing the width or length of the wingsail stowed therein.

Figure 1B:
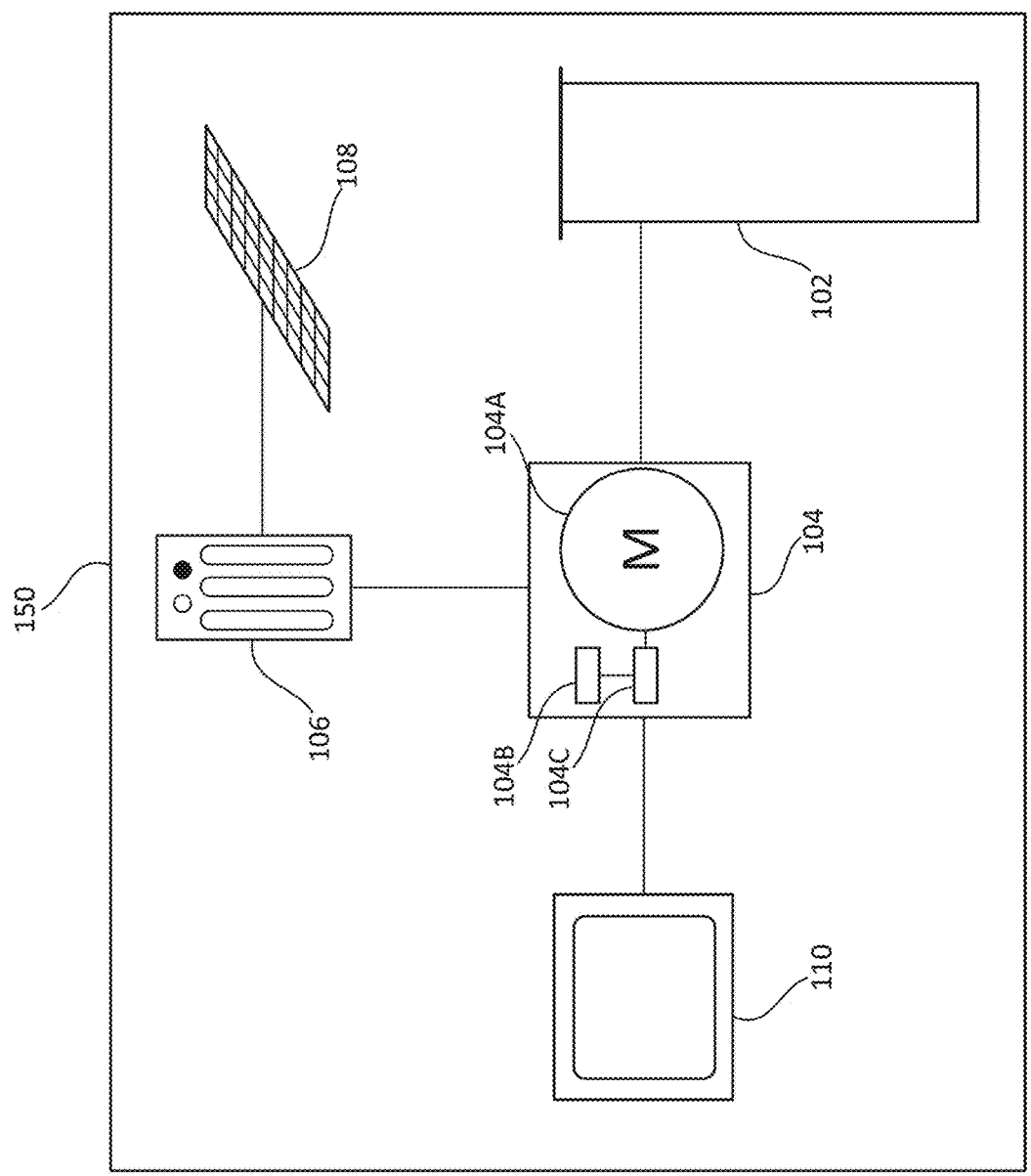
FIG. 1B illustrates a block diagram of a container housing a wingsail according to various embodiments.

FIG. 1A illustrates a system 100 including a wingsail 102 housed in a container 150 according to various embodiments. FIG. 1B illustrates a block diagram of the container 150 housing the wingsail 102 according to various embodiments.

Referring to FIGS. 1A-1B, in some embodiments, the container 150 is a standard-sized shipping container. As a non-limiting example, the container 150 is 2 twenty-foot equivalent units (TEUs). A TEU is a unit of container size that is equivalent to 20 feet (length) by 8 feet (width) by 8 feet (height). In some embodiments, the container 150 is a High Cube container that has a larger height than a 2 TEU container (e.g., having a height of about 9.5 feet). In some embodiments, the container 150 is an extended version of the standard 2 TEU container (e.g., having a length of about 45 feet, 48 feet, or 53 feet). The container 150 may be configured specifically for housing the wingsail or, alternatively, may include a conventional shipping container (configured for conventional shipping use) but modified to include the wingsail 102 and other features as described herein.

In some embodiments, the container 150 is configured to be anchored to a vessel (e.g., a deck of a ship). As such, the container 150 may include a plurality of anchor locations at a plurality of bottom corners of the container 150, or at other suitable locations on the container 150. Each of the anchor locations may be configured to engage with locking locations on the deck of the ship to secure the container 150 to the ship. In some embodiments, the container 150 may be stacked on top of one or more other containers. In such embodiments, the bottom-most container may be anchored to the ship and each subsequent container above the bottom-most container may be anchored to a container directly beneath the subsequent container. In particular embodiments, the container 150 is configured with anchor mechanisms or anchor hold structures that correspond to those used on conventional shipping containers, such that the container 150 may be secured to a container ship in a manner similar to the manner in which a conventional container is secured (without requiring the ship to have customized anchoring structure). In other embodiments, the container 150 may be configured with other suitable anchor mechanisms.

In some embodiments, the system 100 includes the container 150 housing the wingsail 102. The container 150 further includes one or more (or each) of a motor assembly 104, a battery 106, a solar panel 108, and a user interface (UI) 110. In addition, the system 100 includes a computer 112 connected to the container 150 and a tablet 114 wirelessly connected to the container 150.

In some embodiments, the motor assembly 104 includes a motor 104A, a memory 104B, and a processor 104C. The motor 104A is connected to the wingsail 102 and configured to power movement of the wingsail 102 between a deployed position and a housed or retracted position. The memory 104B and the processor 104C are configured to control the operation of the motor 104A.

In some embodiments, the UI 110 is configured to receive input from a user, such as commands to control the wingsail 102. In response to these received commands, the memory 104B and the processor 104C control the motor 104A in accordance with the commands. Furthermore, the wingsail 102 may be controlled via the motor assembly 104 by commands received from the computer 112 or the tablet 114. In some embodiments, the UI 102, the computer 112, and/or the tablet 114 are configured to display status information regarding the container 150 (e.g., the charge remaining in the battery 106).

In some embodiments, the battery 106 is coupled to the motor assembly 104. The battery 106 may provide power to the motor assembly 104. In addition, the battery 106 is coupled to the solar panel 108. The solar panel 108 may provide charge to the battery 106.

In some embodiments, the container 150 houses other types of propulsion aiding mechanisms in addition to, or instead of, the wingsail 102. For example, the container 150 may house a Flettner rotor that is configured to be housed within and deployed from the container 150. In some embodiments, the Flettner rotor may be deployed (e.g., by telescoping or by unfolding) when needed by the ship carrying the container 150, and stowed away (e.g., by retracting or folding) within the container 150 when not needed. In some embodiments, the container 150 houses yet other types of wind capturing devices that are configured to be stowed within and deployed from the container 150, such as, but not limited to, a kite sail.

FIG. 2A illustrates a side view of a ship 200 carrying the wingsail container 150 according to various embodiments. Referring to FIGS. 1A-2A, in some embodiments, the wingsail container 150 is positioned at the top layer of containers. As such, the wingsail 102 can be deployed from the container 150 without being hindered by a container located on top of the container 150. Also, in some embodiments, the container 150 may be located at the highest level of containers so that the wingsail 150 is capable of receiving wind without surrounding containers blocking the wind path of the deployed wingsail 102.

Figure 2B:
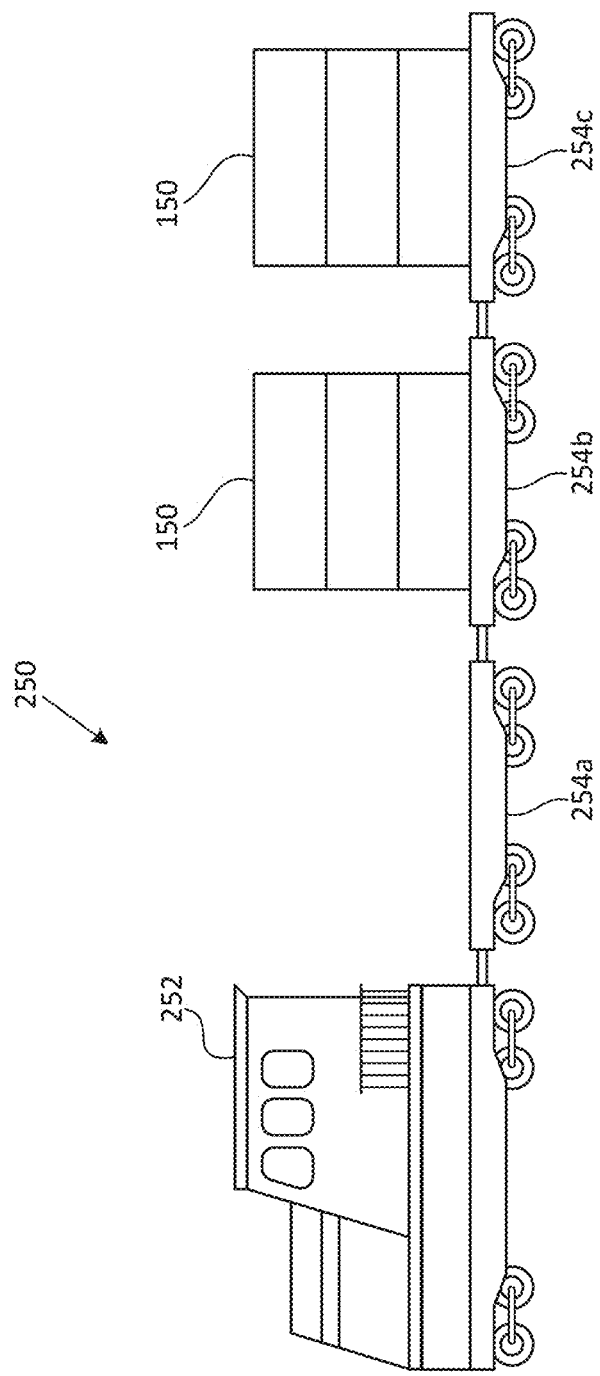
FIG. 2B illustrates a side view of a train carrying a wingsail container according to various embodiments.

FIG. 2B illustrates a side view of a train 250 carrying the wingsail container 150 according to various embodiments. Referring to FIGS. 1A-2B, in other embodiments, the wingsail container 150 may be carried by a train 250 including an engine 252 and a plurality of railcars 254a, 254b, and 254c. In some embodiments, the wingsail containers 150 that are carried by the railcars 254b and 254c are configured to operate (e.g., deploy) the wingsail 102 to provide supplemental thrust to the train 250 for propelling the train 250 forward along a railway, in the same manner that the wingsail 102 is operated (e.g., deployed) on a ship travelling on water, as described herein. In some embodiments, the train 250 has one railcar carrying the wingsail container 150. In other embodiments, the train 250 includes a plurality of railcars 254b and 254c that each carry one or more wingsail containers 150, while including one or more railcars 254a that do not carry a wingsail container 150. In some embodiments, the wingsail container 150 is located on top of the engine 252. Accordingly, the wingsail containers 150 may include anchor mechanisms or anchor hold structures that correspond to those used on conventional shipping containers that anchor to rail cars. In particular embodiments, the anchor mechanisms or anchor hold structures for anchoring to rail cars may be the same as those discussed above for anchoring to a ship deck or other container on a ship. In other embodiments, the wingsail container 150 may include multiple types of anchor mechanisms or anchor hold structures, for example, including one or more for anchoring to a ship deck or other container, and one or more for anchoring to a rail car.

Figure 3C:
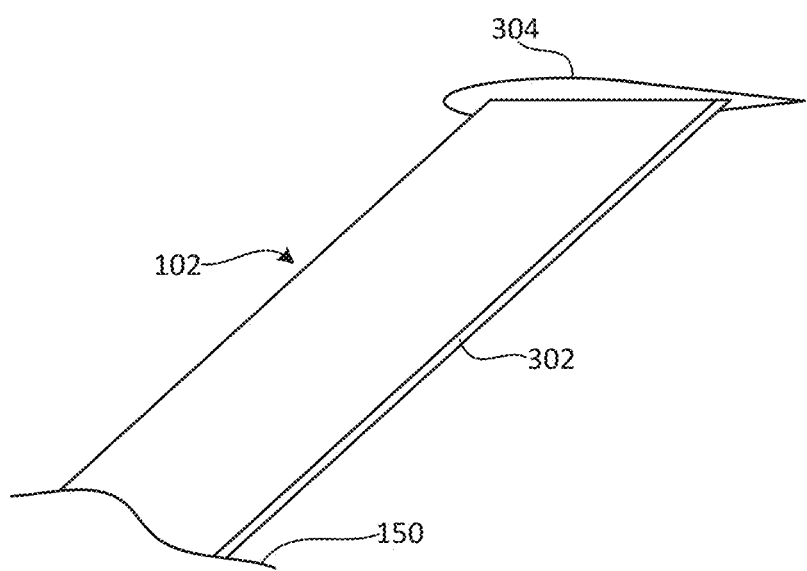
FIG. 3C illustrates a perspective view of a wingsail according to various embodiments.

FIG. 3A illustrates a side view of a deployed wingsail 102 according to various embodiments. FIG. 3B illustrates a top view of the deployed wingsail 102 according to various embodiments. FIG. 3C illustrates a perspective view of the deployed wingsail 102 according to various embodiments.

Referring to FIGS. 1-3C, in some embodiments, the wingsail 102 includes T-strip 302 (or generally perpendicular flange or lip) along an edge of the wingsail 102, an end plate 304 at the top of the wingsail 102 opposite the container 150, and a wind sensor 306. In some embodiments, the wingsail 102 extends from the container 150 such that the wingsail 102 is substantially perpendicular to the container 150, when deployed. In other embodiments, the wingsail 102 may be supported at an oblique angle relative to the container 150. In some embodiments, the wingsail 102 is made from any suitable light-weight, high-strength rigid material, such as, but not limited to, carbon fiber composites. In some embodiments, the wingsail 102 has a steel core with a fiber glass composite layer covering the steel core. In other embodiments, other suitable materials may be used for the core and/or cover layer.

In some embodiments, the wingsail 102 includes a first length-wise edge and a second length-wise edge opposite the first length-wise edge. The T-strip 302 may be located along the second length-wise edge of the wingsail 102 such that airflow contacts the T-strip 302 after contacting the first length-wise edge. In some embodiments, the T-strip 302 is made from any rigid material, such as, but not limited to, fiber glass, steel, sufficiently high strength polymer, or the like. In some embodiments, the T-strip 302 is proportional to the width of the wingsail 102 and is substantially smaller than the width of the wingsail 102 (e.g., about 3 inches wide).

In some embodiments, the end plate 304 may have a teardrop shape including a head, a tail, and an enlarged portion between the head and the tail. Accordingly, the shape of the end plate 304 is configured to channel the wind to flow across the wingsail 102.

In some embodiments, the wind sensor 306 is configured to sense direction and/or strength of the wind. The wind sensor 306 may be coupled to the motor assembly 104 and may dictate the orientation of the wingsail 102 to optimize wind propulsion.

In some embodiments, the wingsail 102 has a lift center at about 50% of a height of the deployed wingsail 102 and at a 25% chord along a width of the deployed wingsail 102. In some embodiments, the wingsail 102 rotationally pivots along an axis along the length of the wingsail 102 extending from the container 150 to the end plate 304, and the axis is located at about a 25% chord of the width.

FIG. 4 illustrates a perspective view of the wingsail 102 deployed from the container 150 according to various embodiments. Referring to FIGS. 1A-4, in some embodiments, the wingsail 102 is deployed by unfolding out of the container 150 at the horizontal pivot axis 402. Furthermore, the wingsail 102 may rotationally pivot, to the optimal orientation for receiving wind for propulsion, about the vertical axis 404. The wingsail may include one or more pivot joints (or multi-axis joints) for rotating, folding or unfolding of the wingsail structure about one or more pivot axes. The one or more pivot joints (or multi-axis joints) may be arranged along the length of the body of the wingsail 102 or along the length of a mast or other support structure for supporting the wingsail in its deployed state (or along the length of both the wingsail body and mast). After deployment and use, the wingsail 102 may again pivot along the horizontal axis 402 for folding and storage within the container 150 until later use. In particular embodiments, the wingsail 102 (or mast or both) includes a plurality of joints along its length for rotation, folding or unfolding at discrete locations along the length of the wingsail 102 (or mast or both), to selectively deploy the wingsail from a stowed state, or retract the wingsail to a stowed state.

In some embodiments, the motor assembly 104 powers the folding into and unfolding out of the container 150. The motor assembly 104 may include any suitable mechanism for deploying and retracting the wingsail 102, such as, but not limited to, a hydraulic system, electric motors, an air-powered system, or the like.

FIGS. 5A, 5B, and 5C illustrate cross-sectional views of the container 150 housing wingsails oriented differently according to various embodiments. Referring to FIGS. 1A-5A, in some embodiments, a wingsail 502 is oriented vertically when housed within the container 150. The wingsail 502 may be housed at the center of the container 150 such that cargo may be stored in the empty space at either side of the container 150.

Referring to FIGS. 1A-5B, in some embodiments, a wingsail 512 is housed horizontally and towards an upper inner surface of the container 150. The wingsail 512 may be deployed from the container 150 by first pivoting about the horizontal axis 402 until extending substantially vertically from the container 150, and then pivot about the vertical axis 404 for proper orientation with respect to wind.

Referring to FIGS. 1A-5C, in some embodiments, a wingsail 522 is housed diagonally within the container 150. More specifically, the width dimension or the length dimension (or both) of the wingsail 522 may be arranged within the container 150 at an angle (diagonal) relative to the width dimension or the length dimension (or both) of the container 150. In such embodiments, the wingsail 522 can be manufactured with a larger surface area (e.g., width or length, or both) relative to a wingsail configuration that is stowed with its width dimension or length dimension (or both) parallel to the width dimension or length dimension (or both) of the container 150. As such, due to its increased surface area, the wingsail 522 may be capable of contacting more wind or air, resulting in greater propulsion of a ship.

FIGS. 6A, 6B, and 6C illustrate perspective views of various wingsail configurations deployed from the container 150 according to various embodiments. Referring to FIGS. 1A-6A, in some embodiments, the container 150 houses two wingsails 602A and 602B. The wingsails 602A and 602B may be configured to deploy at opposite ends of the container 150.

Referring to FIGS. 1A-6B, in some embodiments, the container 150 houses two wingsails 612A and 612B. The wingsails 612A and 612B may be configured to deploy at a same end of the container 150 such that the wingsails 612A and 612B are substantially overlapping with each other. This configuration may be similar to those of biplane aircrafts.

Referring to FIGS. 1A-6C, in some embodiments, the container 150 houses four wingsails 622A, 622B, 622C, and 622D. The wingsails 622A and 622B may form a biplane configuration at a first end of the container, and the wingsails 622C and 622D may form a biplane configuration at a second end of the first container 150 opposite the first end.

In some embodiments, a tie bar is connected between at least two wingsails. The two wingsails may be configured to be deployed from and stowed in the same container. In other examples, the two wingsails may be configured to be deployed from and stowed in two different containers, respectively, where the two containers are arranged adjacent or in sufficient proximity to each other when anchored to a vessel or vehicle. The tie bar is configured to set and synchronize an angle of attack of the at least two wingsails with respect to wind such that the wingsails provide propulsion in substantially the same direction. The tie bar is further configured to set the angle of attack of the at least two wingsails at substantially the same time. For example, wingsails 602A, 602B may have a tie bar connected therebetween so that the angle of attack by the wind is substantially the same between the two separate wingsails 602A, 602B. In some embodiments, the tie bar extends between the two wingsails 602A, 602B along the length of the container 150.

In some embodiments, the tie bar is connected at a same location of each of the wingsails 602A, 602B, for example, at the top of each of the wingsails 602A, 602B, at a same edge of each of the wingsails 602A, 602B, and so on. When connected to the wingsails, the tie bar provides a sufficiently rigid structure to maintain the connected wingsails parallel or at a fixed angle relative to each other, while allowing the connected wingsails to rotate together (about a vertical axis) to a desired orientation relative to the wind direction. Also, by connecting multiple wingsails together with a tie bar, a motor for rotating the wingsails to a desired orientation may be coupled to one of the connected wingsails, to drive both of the connected wingsails. In some embodiments, the tie bar is made from any strong and rigid material suitable for synchronizing the angle of attack of each of the wingsails 602A, 602B, such as, but not limited to, metal, plastic, wood, and so on. In some embodiments, the tie bar is fastened to each wingsail by any suitable securing mechanism, such as, but not limited to, clamping, welding, using adhesive, and so on. In some embodiments, multiple tie bars may be fastened between and to each connected wingsail.

In some embodiments, one or more tie bars may be employed with other wingsail configurations. For example, one or more tie bars may be fastened between the wingsails 612A, 612B. In some embodiments, one or more tie bars are disposed among some or all of the wingsails 622A, 622B, 622C, 622D so that movement and the deployed angle of each wingsail 622A, 622B, 622C, 622D is synchronized with one or more other wingsails. In some embodiments, a first tie bar is attached between wingsails 622A, 622B and a second tie bar is attached between wingsails 622C, 622D. In some embodiments, a first tie bar is attached between wingsails 622A, 622D and a second tie bar is attached between wingsails 622B, 622C. In some embodiments, a first tie bar is attached between wingsails 622A, 622D and a second tie bar is attached between wingsails 622B, 622C. In some embodiments, less than all of the wingsails in a container 150 have a tie bar attached thereto (e.g., wingsails 622A, 622B, 622C have a tie bar attached amongst each other, but 622D does not have a tie bar attached thereto). As an example, and as shown in FIG. 6C, a first tie bar 632 is attached between the wingsail 622C and the wingsail 622D. In addition, a second tie bar 634 is attached between the wingsail 622A and the wingsail 622B.

Figure 7A:
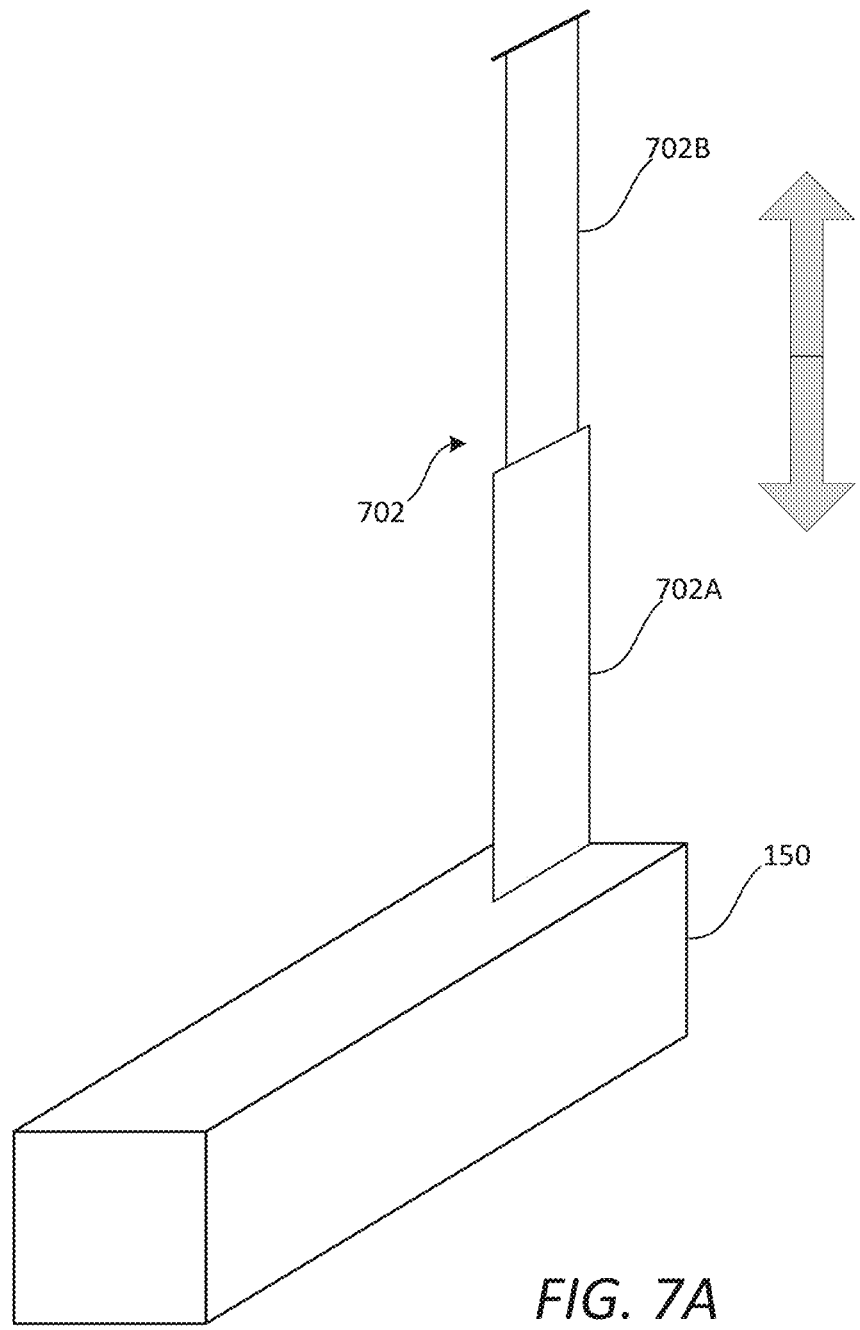
FIG. 7A illustrates a perspective view of a telescoping wingsail deployed from a container according to various embodiments.

FIG. 7A illustrates a perspective view of a telescoping wingsail 702 deployed from the container 150 according to various embodiments. Referring to FIGS. 1-7A, in some embodiments, the wingsail 702 includes a first wingsail portion 702A and a second wingsail portion 702B. In some embodiments, the first wingsail portion 702A is configured to house the second wingsail portion 702B therein, when the wingsail 702 is housed within the container 150. When the wingsail 702 is deployed, the second wingsail portion 702B may extend or telescope from the first wingsail portion 702A, thereby providing more surface area of the wingsail 702 that can receive airflow. At the same time, the wingsail 702 may maintain a compact structure that can fit within the container 150, as the second wingsail portion 702B may retract into the first wingsail portion 702A.

Figure 7B:
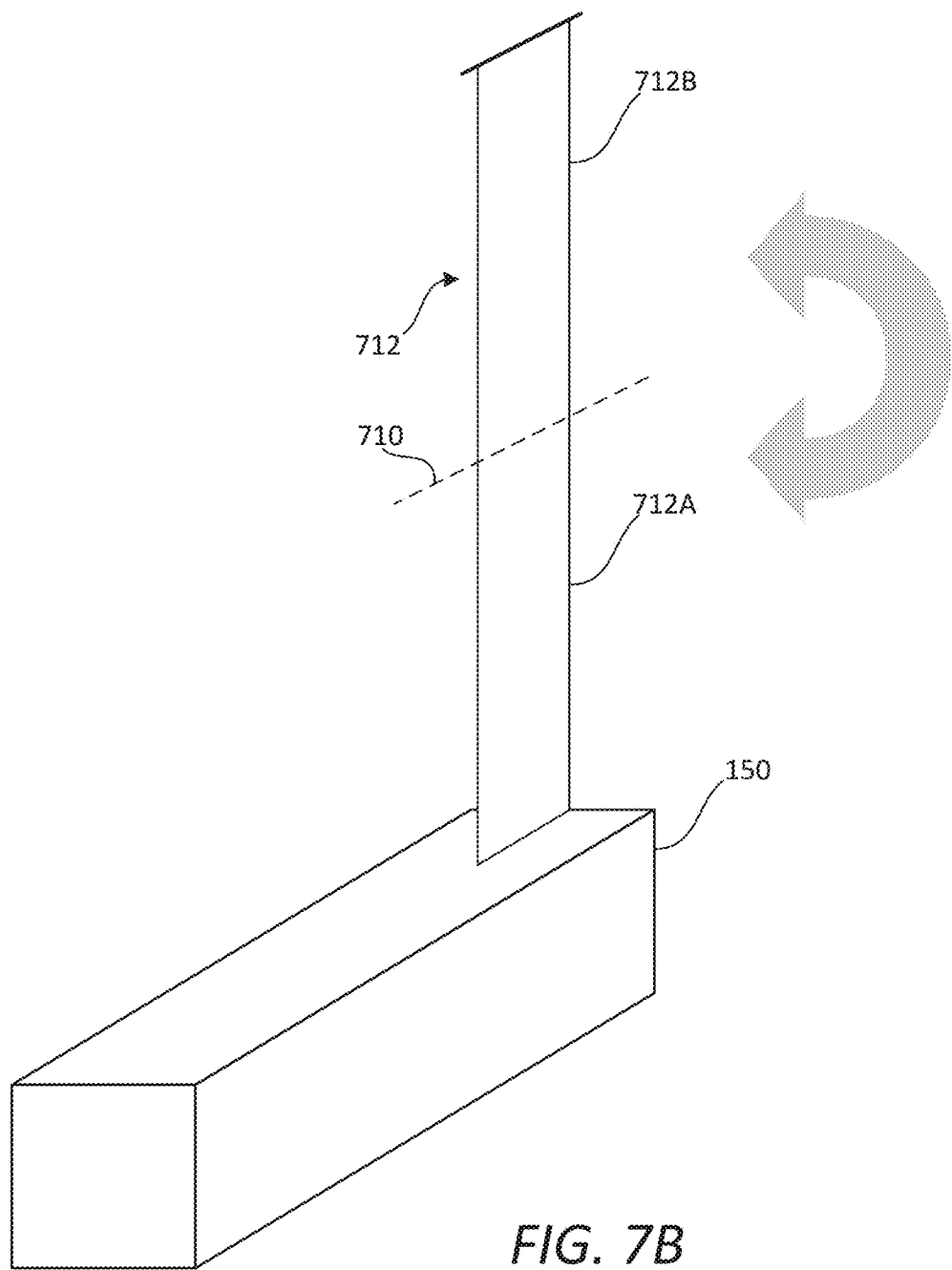
FIG. 7B illustrates a perspective view of a folding wingsail deployed from a container according to various embodiments.

FIG. 7B illustrates a perspective view of a folding wingsail 712 deployed from the container 150 according to various embodiments. Referring to FIGS. 1-7B, in some embodiments, the wingsail 712 includes a first wingsail portion 712A and a second wingsail portion 712B. In some embodiments, the second wingsail portion 712B is configured to unfold at an axis 710 when the wingsail 712 is deployed. In some embodiments, when the wingsail 712 is housed within the container 150, the first wingsail portion 712A and the second wingsail portion 712B are folded on each other so that the wingsail 712 fits within the container 150.

Figure 7C:
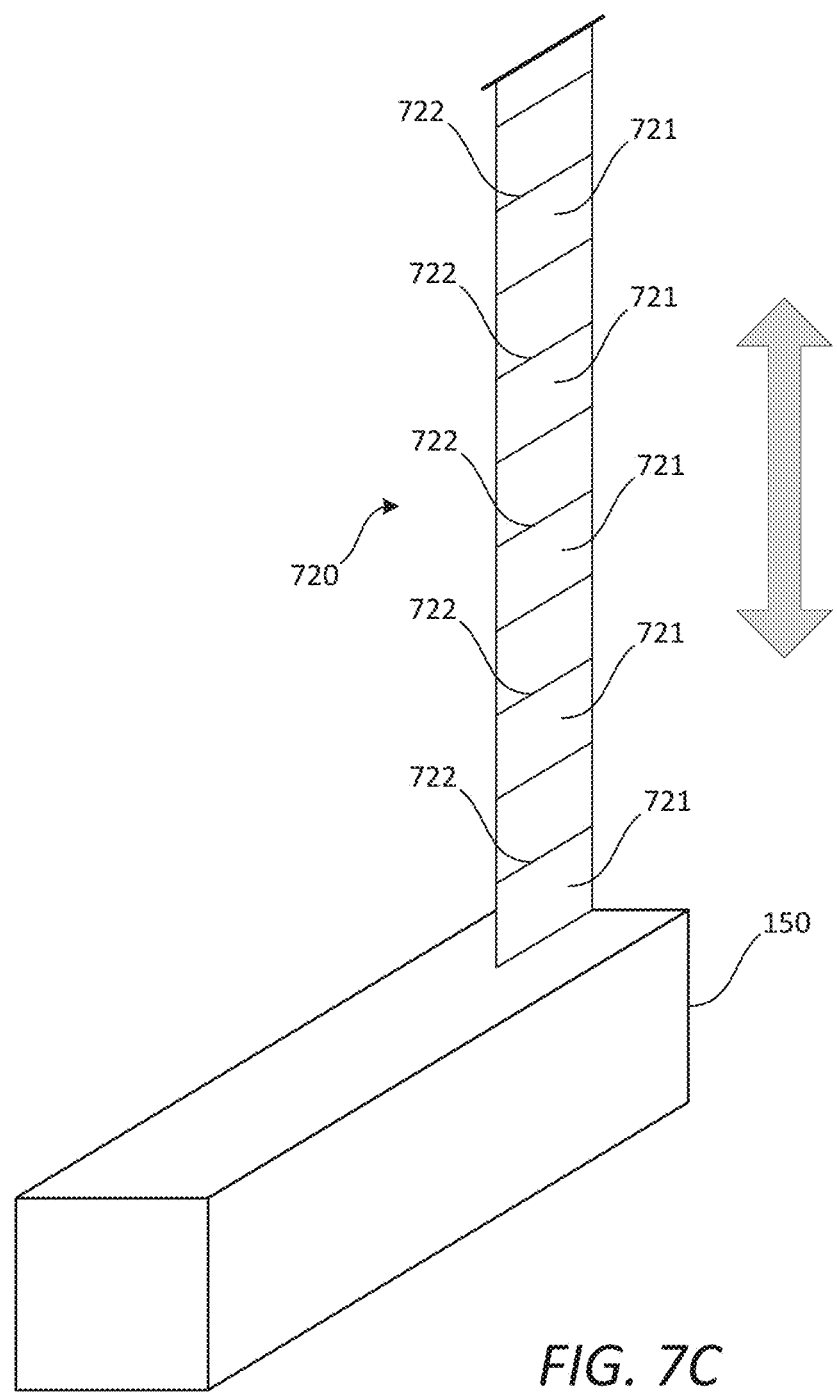
FIG. 7C illustrates a perspective view of a multiple-folding wingsail deployed from a container according to various embodiments.

FIG. 7C illustrates a perspective view of a multiple-folding wingsail 720 deployed from the container 150 according to various embodiments. Referring to FIGS. 1-7C, in some embodiments, the wingsail 720 includes a plurality of wingsail sections 721 that are separated by a plurality of wingsail folds 722. In some embodiments, when deployed, the wingsail sections 721 are separated and in an extended state. However, when housed within the container, the plurality of wingsail sections 721 may be collapsed upon each other at the folds 722, such that the wingsail 720 is in a compact state for storing within the container 150.

In some embodiments, a wingsail includes a combination of the features depicted in FIGS. 7A-7C. For example, in some embodiments, a wingsail unfolds once deployed out of the container 150 (e.g., as shown in FIG. 7B), and then the wingsail is configured to telescope upwards (e.g., as shown in FIG. 7A). Accordingly, in some embodiments, the container 150 can stow additional wingsail material to allow further propulsion when the wingsail is deployed (e.g., additional surface area of the wingsail is deployable from the container 150).

In other embodiments, the multiple-folding wingsail 720 may have a plurality of length-wise wingsail folds, as opposed to the width-wise wingsail folds 722, such that the wingsail 720 includes a plurality of length-wise wingsail sections 721. Accordingly, in some embodiments, a wingsail having the plurality of length-wise wingsail folds may deploy from and retract into the container 150 in a similar manner as that of a conventional hand fan.

Figure 8A:
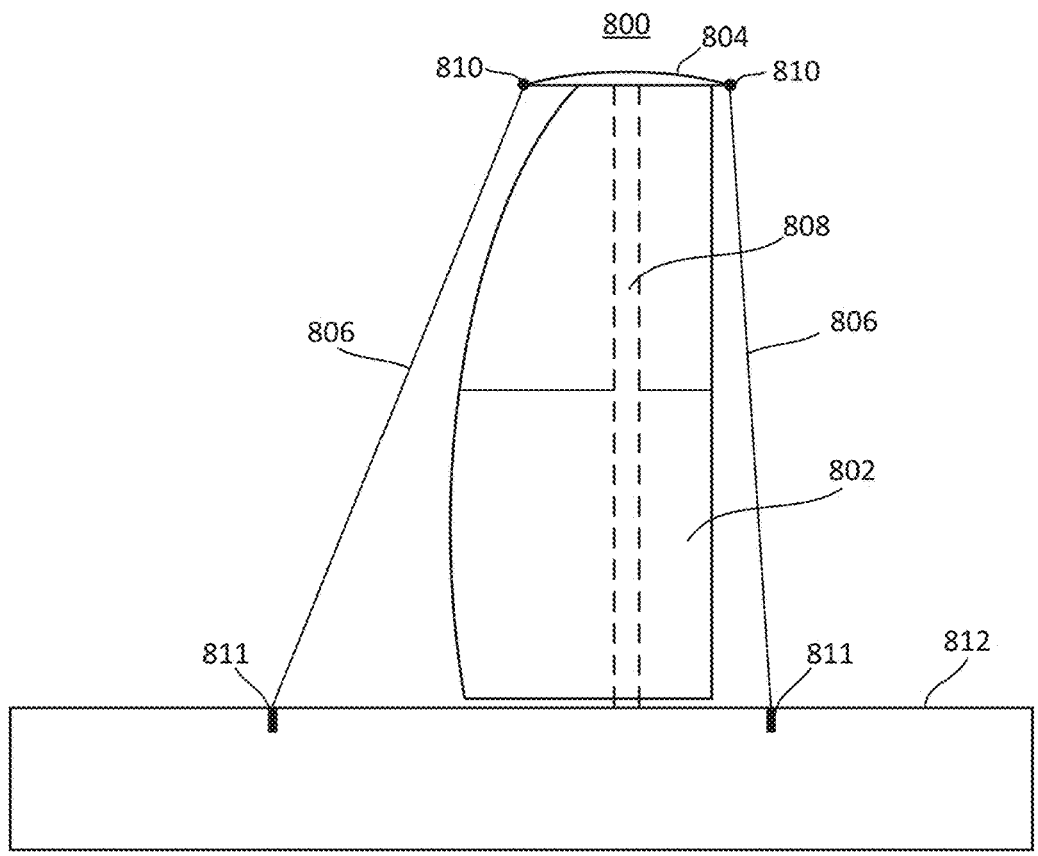
FIG. 8A illustrates a side view of a wingsail system according to various embodiments.
Figure 8B:
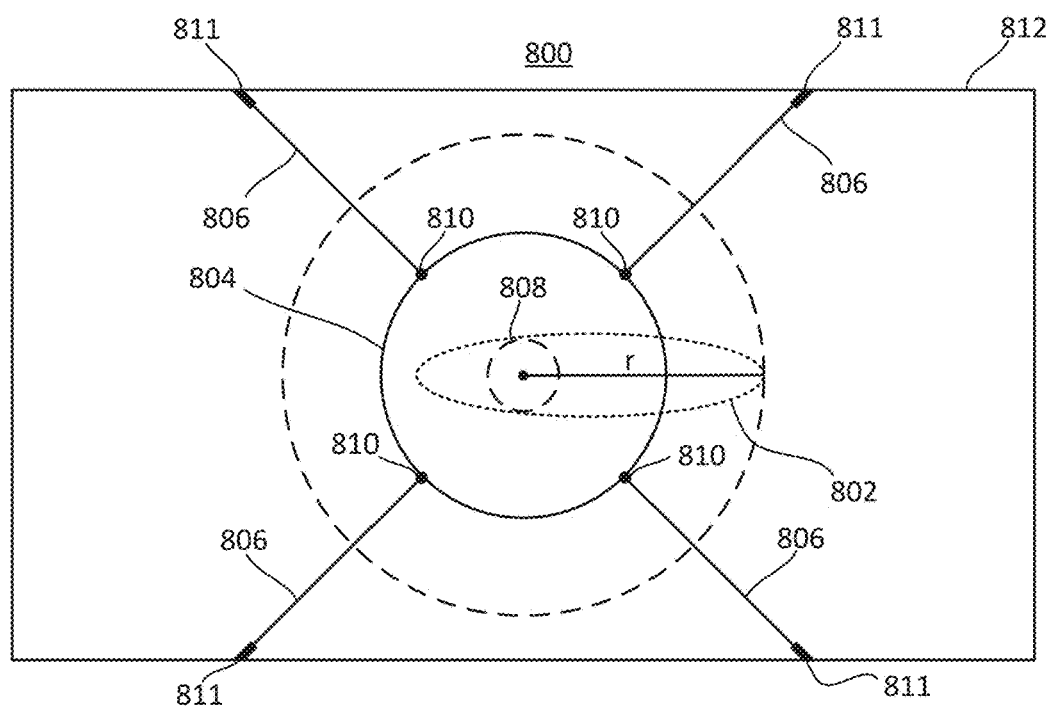
FIG. 8B illustrates a top view of a wingsail system according to various embodiments.

FIG. 8A illustrates a side view of a wingsail system 800 according to various embodiments. FIG. 8B illustrates a top view of the wingsail system 800 according to various embodiments. A conventional vessel or vehicle may not be fitted or manufactured to support shipping container or a wingsail. According to various embodiments, the wingsail system 800 may be added to or installed on a vessel or vehicle that was not initially designed to carry cargo containers or a wingsail. As such, the wingsail system 800 may provide a mechanism for allowing retrofitting of a wingsail onto any suitable vessel or vehicle. Accordingly, in some embodiments, a cost of installation or retrofitting of wingsails on vessels or vehicles is reduced. Furthermore, the vessels or vehicles that would otherwise not be configured to support a wingsail can be re-configured or retrofitted with a wingsail and therefore exhibit reduced fuel costs, greenhouse gases, and emissions.

In some embodiments, the wingsail system 800 includes a wingsail 802, an end plate 804, one or more support cables 806, a wing axle 808, and one or more anchor locations 811 corresponding to anchoring positions of the one or more support cables 806. In some embodiments, the wingsail system 800 is installed atop a vessel 812, such as, but not limited to, on top of a deck of a ship or other water vessel, or on top of a deck of a rail car or other vehicle. In some embodiments, the wing axle 808 is a shaft or tubular structure that is positioned on top of the vessel 812 such that the wing axle 808 (axle of the shaft or tubular structure) extends substantially vertically upwards from the vessel 812. The wing axle 808 may be a hollow structure, for minimizing weight. In other embodiments, the wing axle 808 is a solid structure. In some embodiments, the wing axle 808 is placed on top of the vessel 812 and is secured via the one or more support cables 806. In other embodiments, the lower end of the wing axle 808 is also coupled or otherwise secured in a fixed relation to the vessel 812 by one or more brackets, welding, clamping, form-fitting, and the like. In some embodiments, the wing axle 808 is made from any suitable material for supporting the wingsail system 800, such as, but not limited to, steel, carbon fiber, or other suitable materials.

In some embodiments, the wingsail 802 is similar to wingsails 102, 502, 602, 612, 622, 702, 712, 722, such that the respective descriptions of wingsails 102, 502, 602, 612, 622, 702, 712, 722 are applicable to the wingsail 802. In other embodiments, the wingsail 802 may have other suitable dimensions or shapes. In some embodiments, the wingsail 802 surrounds or is attached to the wing axle 808 such that the wingsail 802 is capable of rotation about the longitudinal axis of the wing axle 808. In some embodiments, the wingsail 802 includes bearings therein to allow 360-degree or near 360-degree rotation about the wing axle 808. In some embodiments, the wingsail 802 is designed to rotate about the wing axle 808 in a circle having a radius r shown in FIG. 8B (e.g., a radius r defined by a width dimension of the wingsail 802). In some embodiments, the radius r is large enough for the wingsail 802 to be rotated to a suitable position to transform natural wind into propulsion energy, regardless of the direction that the wind is directed. In some embodiments, the wingsail system 800 includes a control system for rotating the wingsail 802 about the wing axle 808. For example, the wingsail system 800 may include a motor assembly (e.g., similar to motor assembly 104) for rotating the wingsail 802 to its optimal position for providing propulsion to the vessel 812.

In some embodiments, an end plate 804 is positioned or located on top of the wing axle 808. In some embodiments, the end plate 804 is fastened to the wing axle 808 to secure the end plate 804 to the wing axle 808 by, for example, but not limited to, welding, clamping, bolting, using adhesive, and the like. In some embodiments, the end plate 804 does not rotate (e.g., like the wingsail 802 does), and is therefore stationary. As such, in some embodiments, one or more accessories are affixed to the top or other portion of the end plate 804, such as, but not limited to, a radar, lights, a wind vane, an acoustic mechanism (e.g., a speaker), or other electronics. In some embodiments, the end plate 804 improves efficiency of the wingsail 802 by reducing vortexes (the "end plate effect") that are typically generated in a system that lacks the end plate 804. In embodiments in which the wing axle 808 includes a hollow tubular structure, through which electrical wiring may be run for connecting radar, lights, speakers or other electronic devices affixed to the end plate 804 to computers, control systems or other electronics located on the vessel.

In some embodiments, the dimensions of the end plate 804 are selected or sized such that vortex losses are minimized at the wingsail 802. Furthermore, the end plate 804 is sized large enough (e.g., has a large enough diameter) such that the support cables 806 do not interfere with the wingsail 802, as the wingsail 802 rotates. For example, at any position along the length of each support cable 806, a minimum radius (from the central axis of the wing axle 808) defined by the support cables 806 is greater than a radius of the wingsail 802 around the wing axle 808 (e.g., a radius of the wingsail 802 at that position, or the radius r). In some embodiments, the plate is shaped to be aerodynamic, for example, as a domed or curved or angled shape (e.g., to allow wind to traverse the end plate 804 with minimal interference from the end plate 804).

In some embodiments, the support cables 806 are coupled or otherwise fastened to fastening locations 810 along the perimeter of the end plate 804. In some embodiments, the number of fastening locations 810 is equal to the number of affixed support cables 806. In other embodiments, the number of fastening locations 810 is greater than the number of affixed support cables 806, to allow selective positioning or re-positioning of the support cables 806 relative to the end plate 804. In some embodiments, the fastening locations 810 are located at regular intervals along the perimeter of the end plate 804. In other embodiments, the fastening locations 810 are located at irregular intervals along the perimeter of the end plate 804. In some embodiments, each of the support cables 806 is affixed to a corresponding fastening location 810 by way of, for example, tying, welding, clipping, and the like.

In some embodiments, the anchor locations 811 are located on the vessel 812. In some embodiments, the anchor locations 811 are located on the outside of the vessel 812 along a sheer line. In some embodiments, the anchor locations 811 are located at a location where the deck and the hull of the vessel 812 meet. In some embodiments, each of the support cables 806 is anchored or otherwise fastened at respective anchor locations 811 at an end of the support cable 806 (e.g., a first end) opposite the end of the support cable 806 (e.g., a second end) affixed to a respective fastening location 810. Accordingly, in some embodiments, the support cables 806 are taut between the end plate 804 and the anchor locations 811 to support and stabilize the wingsail system 800, with the central axis of the wing axle 808 oriented substantially, vertical. In some embodiments, the support cables 806 are fastened to the anchor locations 811 by any suitable method, such as, but not limited to, bolding, welding, clamping, tying, and the like. In some embodiments, the number of support cables 806 affixed between the end plate 804 and the vessel 812 is four or more (e.g., five, six, seven, or more). In other embodiments, the number of support cables 806 affixed between the end plate 804 and the vessel 812 is less than four (e.g., three). In some embodiments, the support cables 806 are manually or automatically tightened (e.g., individually and/or by rotational force at the anchor locations 811) to provide tension along the support cables 806 for securing the wingsail 802 to the vessel 812. In some embodiments, the support cables 806 are made from any suitable material for supporting the wingsail system 800, such as, but not limited to, spectra fiber, synthetic rope, steel (e.g., galvanized steel), and the like.

In some embodiments, by utilizing the support cables 806 between the end plate 804 and the vessel 812, engineering loads on the vessel 812 (e.g., loads on a hull of a ship) are reduced. For example, in some embodiments, ten times less force on the vessel 812 (e.g., force on the hull of a ship) is exerted by the wingsail system 800 (e.g., in using the support cables 806). Furthermore, in some embodiments, by providing supplemental support via the support cables 806, a less expensive or lower strength material may be employed in the wing axle 808. In addition, in some embodiments, the end plate 804 provides the multiple functions of providing an anchor for the support cables, reducing vortex losses, and providing a mounting location for lights, radar or other devices.

In some embodiments, the wingsail system 800 is permanently affixed to the vessel 812 such that the wingsail system 800 is permanently erect. In other embodiments, the wingsail system 800 is deployable atop the vessel. For example, the wing axle 808 may be configured to telescope upwards into an erect position and pull or stretch the support cables 806 taught, to allow a stable position of the wingsail system 800 when fully deployed. In some embodiments, the support cables 806 may be configured to be pulled taught manually, or by motor-driven mechanical cable pulling devices, after telescoping or unfolding deploying of the wingsail, to stabilize the deployed wingsail in its deployed position. In some embodiments, the wingsail system 800 is removable and replaceable from atop the vessel 812, for example, by being stowed in and deployable from a container (e.g., container 150). In embodiments in which the wingsail system 800 is installed on a rail car system (e.g., on train 250), the description above may be similarly applicable (e.g., where the wingsail system 800 can be installed atop one or more railcars 254*a*, 254*b*, and 254*c*).

FIG. 9A and FIG. 9B illustrate a side view of the container 150 including a wingsail 102 and an air deflection panel 902 according to various embodiments. In some embodiments, the air deflection panel 902 is affixed to a side of the container 150. The air deflection panel 902 may substantially cover a surface of the container 150 (e.g., most or all of a side surface of the container 902). In other embodiments, the air deflection panel 902 covers a portion of a side surface of the container 150 (e.g., three-fourths, half, or less than half of the side surface of the container 150). In some embodiments, the air deflection panel 902 is made from any suitable material, such as, but not limited to, steel, wood, and the like. In some embodiments, one or more (or a plurality of) air deflection panels 902 are attached to each of one or more (or a plurality of different) side surfaces of the container 150, e.g., at opposite sides of the container 150.

The air deflection panel 902 is moveable between a folded state (FIG. 9A) and an extended state (FIG. 9B). In some embodiments, the air deflection panel 902 is pivotally attached to the container 150 (e.g., by a pivotal linkage or hinge) along one edge (for example, the top edge) of the air deflection panel 902, such that the air deflection panel 902 (from its bottom edge) pivots outwards about the axle of the hinge. When pivoted outward, the air deflection panel 902 defines an angled surface (angled relative to the side surface of the container 150 that is covered by the air deflection panel), such that wind blowing towards the side surface of the container 150 can be directed by the angled surface of the air deflection panel 902 towards the wingsail 102 (e.g., as shown in FIG. 9B). In some embodiments, vortex disturbances that would otherwise be produced at sharp corners of the container 150 can be reduced by use of the extended air deflection panel 902. Thus, the extended air deflection panel 902 can allow the container 150 to be more aerodynamic and can help to direct more air flow toward a deployed wingsail 102. In some embodiments, the air deflection panel 902 may be moved to an extended (angled) state when (or only when) the wingsail 102 is deployed. In other embodiments, the air deflection panel 902 also may be extended when the wingsail 102 is stowed within the container 150, to improve the aerodynamics of the container 150. In yet other embodiments, a container 150 may be configured with and include one or more air deflection panels 902, but not contain a wingsail 102, for example, to provide a container 150 with improve the aerodynamics.

In some embodiments, a motor assembly is coupled to the air deflection panel 902 to move the panel between the folded state and the extended state. The motor assembly may be coupled to a gear, hydraulic pump or other suitable mechanism for moving the air deflection panel 902 between the folded state and the extended state. For example, a telescoping hydraulic cylinder may be coupled at one end to the air deflection panel 902 and at another end to the container 150, such that when pressurized, the hydraulic cylinder expends in length and pivots the air deflection panel 902 outward to an extended state as shown in FIG. 9B, and when unpressurized, the hydraulic cylinder retracts in length to allow the air deflection panel 902 to pivot downward (e.g., by gravity or manual pressure) to a folded state, as shown in FIG. 9A. In such embodiments, the telescoping hydraulic cylinder may be coupled to a pressurized fluid source or motor for providing pressurized fluid (gas or liquid) to the hydraulic cylinder, for selectively expanding or retracting the length of the telescoping hydraulic cylinder. In other embodiments, a motor connected to a suitable gear, lever or other mechanical linkage structure may be coupled to the air deflection panel 902 in any suitable manner, for selectively moving the air deflection panel between the folded state and the extended state. In yet other embodiments, manual force may be used to lift or push the air deflection panel 902 between the folded state and the extended state, as desired. In particular embodiments, the hydraulic cylinder or other linkage structure may be configured to maintain the air deflection panel 902 in an extended state, once moved to that state and until the air deflection panel 902 is selectively moved to the folded state. In other embodiments, a further mechanical or electromechanical lock mechanism is provided to lock and retain the air deflection panel 902 in an extended state, once moved to that state and until unlocked from that state.

Figure 10B:
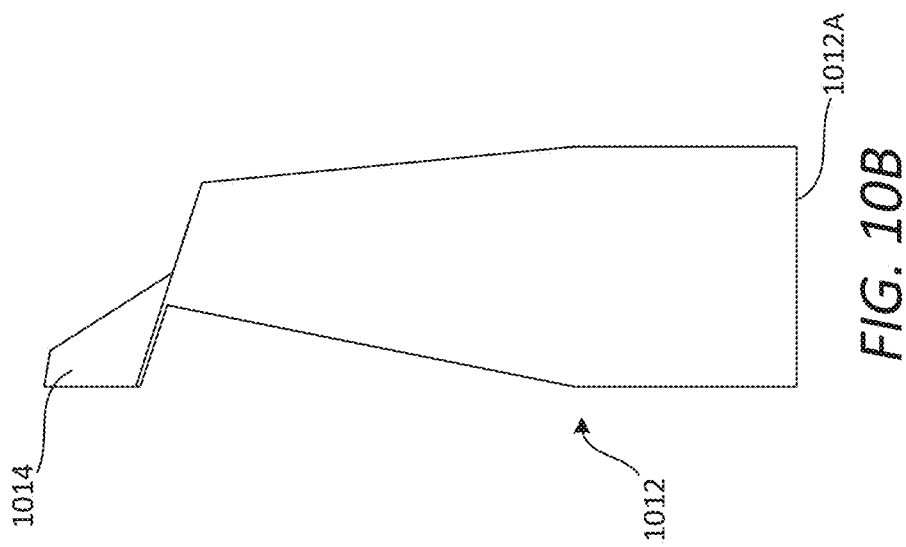
FIG. 10B illustrates a side view of a wingsail according to various embodiments.
Figure 10A:
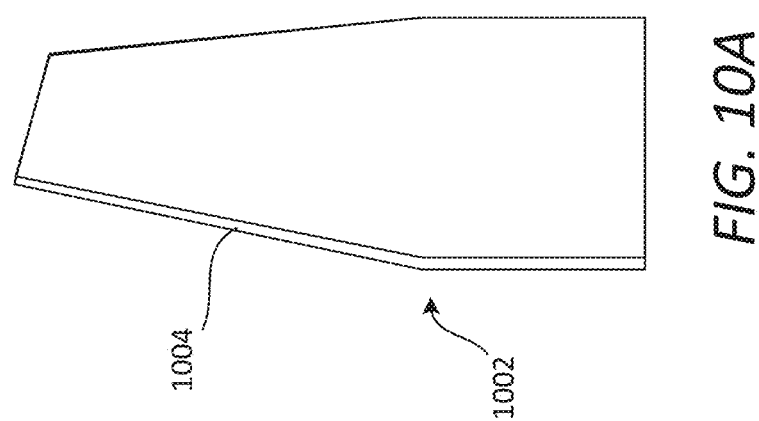
FIG. 10A illustrates a side view of a wingsail according to various embodiments.

FIG. 10A illustrates a side view of a wingsail 1002 according to various embodiments. FIG. 10B illustrates a side view of a wingsail 1012 according to various embodiments. In some embodiments, a wingsail includes an airflow control mechanism for controlling or directing wind as it flows over the body of the wingsail to control the related thrust provided by the wingsail.

Referring to FIG. 10A, in some embodiments, the wingsail 1002 includes a vertical axis control flap 1004 along a trailing edge of the wingsail 1002 (e.g., an edge where the wind contacts the wingsail 1002 second or after initially contacting the wingsail 1002 at an opposite edge to the trailing edge). The vertical axis control flap 1004 is configured to control the angle of attack of the wingsail 1002 with respect to the wind. Accordingly, in some embodiments, the airflow over the flap causes the wingsail 1002 to engage into the wind and therefore provide thrust. In some embodiments, the vertical axis control flap 1004 is configured to pivot about the trailing edge of the wingsail 1002. In other embodiments, the vertical axis control flap 1004 is fixed at a predetermined orientation with respect to the trailing edge of the wingsail 1002 (e.g., at a 45-degree orientation with respect to a plane on which the main body of the wingsail 1002 lies). The vertical axis control flap 1004 may be oriented at various angles with respect to the main body of the wingsail 1002 to suitably cause the main body of the wingsail 1002 to rotate in relation to the predominant direction wind if coming from, such as, but not limited to 30-degrees, 70-degrees, or any other suitable angle. In some embodiments, the vertical axis control flap 1004 is perpendicular to the main body of the wingsail 1002. In some embodiments, the vertical axis control flap 1004 is coupled to a motor for changing the orientation of the vertical axis control flap 1004. In some embodiments, the vertical axis control flap 1004 is made from a same material as that of the main body of the wingsail 1002. In other embodiments, the vertical axis control flap 1004 is made from a more rigid material, such as, but not limited to, metal, plastic, and so on.

Referring to FIG. 10B, in some embodiments, the wingsail 1012 includes a protruding portion 1014 at a top of the wingsail 1012. The protruding portion 1014 includes a rear vertical axis flap or trim tab at the upper trailing edge of the wingsail 1012. In some embodiments, the protruding portion 1014 is configured to utilize airflow over this portion to cause the larger wingsail 1012 to engage into the wind and therefore provide thrust similar to physics of a common airplane wing. In some embodiments, the protruding portion 1014 extends upwards beyond the main body of the wingsail 1012, at an angle with respect to a bottom surface 1012A of the wingsail 1012. In some embodiments, the protruding portion 1014 is configured to pivot about the upper edge of the wingsail 1012. In other embodiments, the protruding portion 1014 is fixed at a predetermined orientation with respect to the bottom surface 1012A of the wingsail 1012 (e.g., at a 45-degree orientation). The protruding portion 1014 may be oriented at various angles with respect to the bottom surface 1012A of the wingsail 1012 to suitably rotate in relation to the wind at a given angle, such as, but not limited to 30-degrees, 70-degrees, or any other suitable angle, causing the main body of the sail to be positioned at an angle in relation to the wind that causes thrust. In some embodiments, the protruding portion 1014 is coupled to a motor for changing the orientation of the protruding portion 1014. In some embodiments, the protruding portion 1014 is made from a same material as that of the main body of the wingsail 1002. In other embodiments, the protruding portion 1014 is made from a more rigid material, such as, but not limited to, metal, plastic, and so on.

Figure 11:
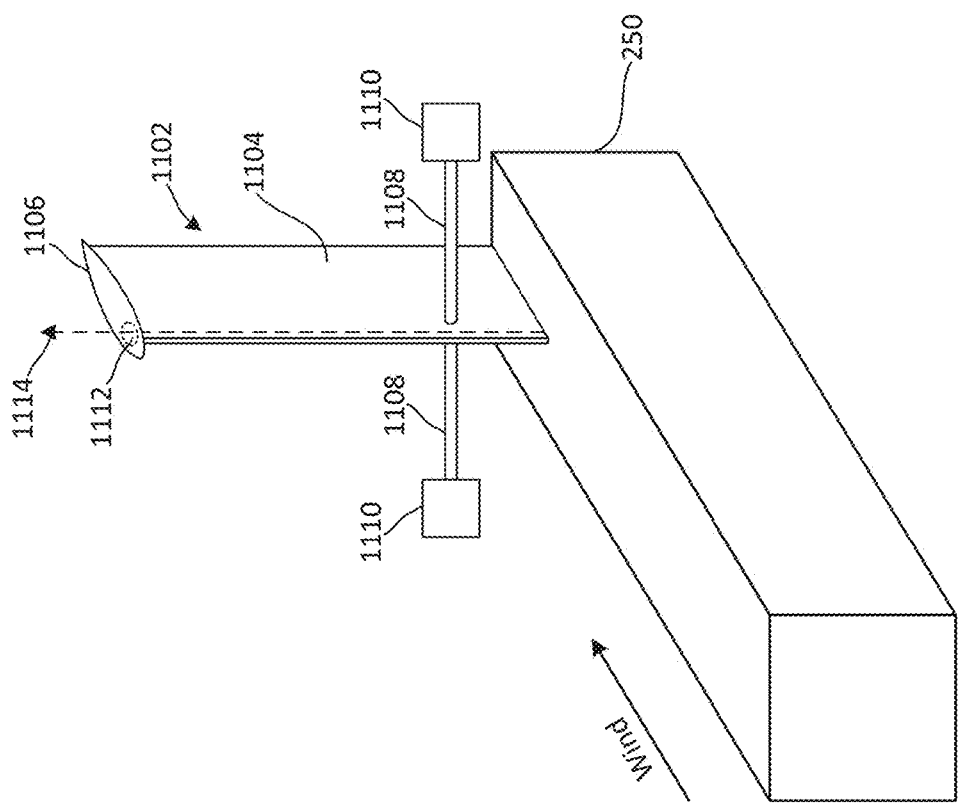
FIG. 11 illustrates a perspective view of a wingsail deployed from a container, according to various embodiments.

FIG. 11 illustrates a perspective view of a wingsail 1102 deployed from a container 250, according to various embodiments. In various embodiments, the wingsail 1102 may correspond to, or be similar to or the same as the wingsails 102, 502, 602, 612, 622, 702, 712, 722, and 802, such that the respective descriptions of the wingsails 102, 502, 602, 612, 622, 702, 712, 722, and 802 may be applicable to the wingsail 1102. In other embodiments, the wingsail 1102 may have other suitable dimensions, shapes, components, or configurations. For example, in some embodiments, the wingsail 1102 may include features corresponding to one or more of a T-strip (or generally perpendicular flange or lip) along an edge of the wingsail, an end plate at the top of the wingsail opposite the container 250, or a wind sensor, such as described with reference to the T-strip 302, the end plate 304, and wind sensor 306 in the embodiment of FIG. 3. In other embodiments, the wingsail 1102 does not include a T-strip, an end plate, and/or a wind sensor. For example, in other embodiments, the T-strip and/or the wind sensor may be omitted.

The container 250 may correspond to, or be similar to or the same as the containers 150, such that the respective descriptions of the containers 150 may be applicable to the container 250. In other embodiments, the container 250 may have other suitable dimensions, shapes, components, or configurations. For example, in some embodiments, the container 250 may include features corresponding to an air deflection panel affixed to a side thereof (e.g., a rear-facing side), such as described with reference to the air deflection panel 902 in the embodiment of FIG. 9. In other embodiments, the container 250 does not include an air deflection panel. In still other embodiments, the container 250 may be omitted, such that the wingsail 1102 is anchored or mounted to a surface of a vehicle or vessel, for example, such as a ship deck, a rail car, the vessel 812, or the like.

As shown in FIG. 11, in various embodiments, the wingsail 1102 may extend from a surface of the container 250 (or the surface of a vessel or vehicle) such that the wingsail 1102 is substantially perpendicular to the container 250, when deployed. In other embodiments, the wingsail 1102 may be supported at an oblique angle relative to the container 250. In some embodiments, the wingsail 1102 may include a wing body 1104 and an end plate 1106 at the top of the wing body 1104 opposite the container 250 (for example, corresponding or similar to the end plate 304 discussed above). In some embodiments, the wing body 1104 is made from a light-weight, high-strength rigid material, such as, but not limited to, carbon fiber composites. In other embodiments, the wing body 1104 may be made from other suitable materials. In some embodiments, the wing body 1104 has a steel core with a fiber glass composite layer covering the steel core. In other embodiments, other suitable materials may be used for the core and/or cover layer. In some embodiments, the end plate 1106 may have a teardrop shape including a head, a tail, and an enlarged portion between the head and the tail, such that the shape of the end plate 1106 is configured to channel wind to flow across the wingsail 1102. In other embodiments, the end plate 1106 may have other suitable dimensions or shapes.

The wingsail 1102 may include a wing axle 1112, such that the wingsail 1102 can rotate or pivot about the wing axle 1112. For example, in some embodiments, the wing axle 1112 may be a tubular structure (e.g., a pole, shaft, axle, spindle, or the like) that is attached or disposed within the wing body 1104, such that the wingsail 1102 can rotate or pivot about a longitudinal axis 1114 of the wing axle 1112. In some embodiments, the wing axle 1112 is stationary when deployed (or not rotatable), and the wingsail 1102 is mounted for rotation on (around) the wing axle 1112. In other embodiments, the wing axle 1112 is supported for rotation about its axis when deployed, and the wingsail 1102 is mounted to the wing axle 1112 in a fixed relation, to rotate with the wing axle 1112. In some embodiments, the wing axle 1112 may be a hollow structure, for minimizing weight. In other embodiments, the wing axle 1112 is a solid structure, for example, for increased strength or durability. In various embodiments, the wing axle 1112 is made from any suitable rigid material for supporting the wingsail 1102, such as, but not limited to, steel, carbon fiber, or any other suitable materials. In some embodiments, the end plate 1106 may be positioned or located on top of the wing axle 1112, such that the end plate 1106 covers a top of the wing axle 1112. The end plate 1106 may be attached or fastened to the wing axle 1112 by, for example, but not limited to, welding, clamping, bolting, adhesives, and/or the like. In other embodiments, the end plate 1106 may cover a top of the wing axle 1112 without being attached or fastened to the wing axle 1112, and/or the top of the wing axle 1112 may be exposed through a top of the end plate 1106.

In various embodiments, one or more trim plates 1110 may be supported by a trim plate support structure on one or both sides of the wing body 1104. In the embodiment of FIG. 11, a trim plate support structure includes at least one shaft (e.g., cross-boom, axle, rod, spindle, beam, pole, or the like)

1108 extending from one or both side surfaces of the wing body 1104. One or more trim plates 1110 may be attached along a length dimension of the shaft 1108. In the embodiment in FIG. 11, the shaft 1108 has a first shaft segment 1108a extending from a first side of the wing body 1104 and a second shaft segment 1108b extending from a second side (facing opposite the first side) of the wing body 1104. In certain embodiments, the shaft segments 1108a and 1108b are portions of the same shaft (such as a single unitary and integral shaft). In other embodiments, the shaft segments 1108a and 1108b are separate shafts.

In various embodiments, the trim plates 1110 may control movement (or steering) of the wing body 1104 to set an angle of attack (AOA) for the wingsail 1102 with respect to the wind. In some examples, this action may be similar to the way split rudders at the wing-tips of A6 and B2 aircrafts are used for drag and yaw control. For example, in some embodiments, depending on a position or state of the trim plates 1110, the wind may exert a force on the trim plates 1110 to cause the wing body 1104 to pivot or rotate about the wing axle 1112. Accordingly, in some embodiments, the pivoting movement of the wing body 1104 about the wing axle 1112 may be powered by only the wind, without requiring an additional power source (e.g., an electric power source) to drive the pivoting movement of the wing body 1104. In other embodiments, an additional power source (e.g., an electric-powered motor) may be used to drive (or to provide added drive force) along at least a portion of the motion or range of the pivoting movement of the wing body 1104 about the wing axle 1112.

For example, in some embodiments, the shaft 1108 (or shaft segments 1108a and 1108b) may extend perpendicularly or substantially perpendicularly from at least one side surface of the wing body 1104, such that the shaft 1108 (or shaft segment 1108a and 1108b) is parallel or substantially parallel to a top surface of the container 250 (or the ground or water). In other embodiments, the shaft 1108 (or shaft segments 1108a and 1108b) may extend at an oblique angle relative to the surface of the wing body 1104. The shaft 1108 may support one or more trim plates 1110 along the length of the shaft 1108, and may support the one or more trim plates 1110 at a location spaced away from the side surface of the wing body 1104. In various embodiments, the shaft 1108 may be made from any suitable high-strength rigid material, such as, but not limited to, metal, plastic, composites, or other suitable materials. In other examples, other suitable trim plate support structures, for supporting one or more trim plates 1110 on one or both sides of the wing body 1104 may be employed with or as an alternative to the shaft 1108.

In various embodiments, one or more trim plates 1110 may be supported along the length of the shaft 1108 (or each shaft segment 1108a and 1108b). For example, as shown in FIG. 11, one trim plate 1110 may be supported on each side of the shaft 1108 (or on each shaft segment 1108a and 1108b). In other embodiments, more than one trim plate 1110 may be supported on the shaft 1108 (or each shaft segment 1108a and 1108b) on one or both sides of the wing body 1104. In other embodiments, the shaft 1108 may include only one of the shaft segments 1108a or 1108b (and not the other shaft segment), extending from only one side surface of the wing body 1104, on which one or more trim plates 1110 are supported. In some embodiments, the trim plate 1110 may be supported at a distal end of the shaft 1108 (or shaft segment 1108a and 1108b). In other embodiments, the trim plate 1110 may be supported at any other suitable location along the length of the shaft 1108 (or shaft segment 1108a and 1108b).

Each of the trim plates 1110 may be configured to provide and control an amount of force (wind force), for controlling a rotational position of the wing body 1104, relative to the axis of the wing axle 1112. In particular embodiments, the trim plates 1110 may have one or more of a shape, size, and location or position relative to the wing body 1104, configured for providing a desired force (wind force) magnitude or direction on the wing body 1104, when exposed to wind. In certain embodiments, the trim plates 1110 may be configured to be moveable, expandable, retractable, extendable, or the like, to change or control the force (wind force) applied to the wing body, as desired.

Each of the trim plates 1110 may have a first surface (or side) configured to oppose or catch wind and apply a force on the wing body 1104 (through the shaft 1108), for urging the wing body 1104 in a rotary direction around an axis 1114 of the wing axle 1112. In certain embodiments, one or more (or each) trim plate 1110 may be configured to be transitioned (e.g., rotated, opened/closed, or the like) between a first position or state and a second position or state, such that, when in the first position or state, the first surface (or side) is presented, relative to a wind direction, such that a first (maximum or larger) surface area opposes or catches the wind. In the second position or state, the trim plate 1110 presents a second surface (or side) relative to the wind direction, such that a second (minimum or smaller) surface area opposes the wind. In certain embodiments, each trim plate 1110 may be selectively transitioned to and between the first and second positions or states, or to one or more positions or states between the first and second states, for selectively controlling the amount of wind force applied to the wing body 1104.

In some embodiments, the trim plates 1110 may have a plate-like structure having any suitable shape, for example circle, square, triangle, and/or the like. In other embodiments, the trim plates 1110 may have other suitable structures and/or shapes, for example such as a concave (cup or bowl-like) structure, a cylindrical structure, an openable/closable jaw-like structure, a flexible sock or a windsock type structure, or the like. In various embodiments, each of the trim plates 1110 may be made from any suitable high-strength material, such as, but not limited to, metals, plastics, composites, fabrics, or any suitable combinations thereof. In other embodiments, each of the trim plates 1110 may be made from other suitable materials depending on the structure of the trim plates 1110.

Figure 12A:
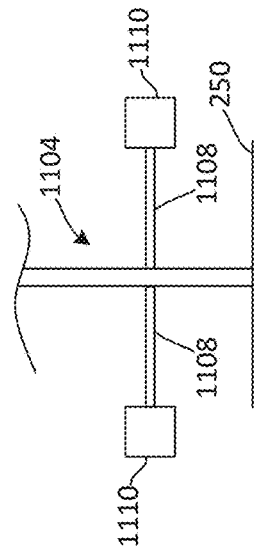
FIGS. 12A to 12C show a front sectional view of the wingsail of FIG. 11 with the trim plates shown in various positions, according to various embodiments.
Figure 12B:
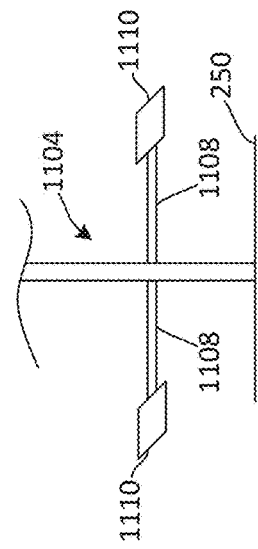
Figure 12C:
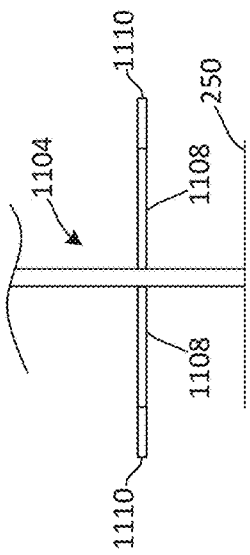

For example, FIGS. 12A to 12C show a front sectional view of the wingsail 1102 of FIG. 11 with the trim plates 1110 shown in various positions. For assisting in the description, it is assumed that in FIGS. 12A to 12C, the wind direction is generally horizontal (in the orientation of drawings), and into or out of plane of the page. In FIG. 12A, each of the trim plates 1110 is shown in a first position (or open position) in which a first (or greater) surface area, or the main wind opposing surface, of each of the trim plates 1110 is fully (or maximally) opposed to the relative wind forces. On the other hand, referring to FIG. 12C, each of the trim plates 1110 is shown in a second position (or closed position) in which the main wind opposing surface is directed perpendicular or substantially perpendicular to the wind direction, and a second (or smaller or minimum) surface area of the trim plates 1110 is opposed to the relative wind forces, to minimally oppose the wind. Referring to FIG. 12B, each of the trim plates 1110 is shown in a third position (or intermediate position) in which some (but not all) of the surface area of the main wind opposing surface of each of the trim plates 1110 is opposed to the wind.

For example, in some embodiments, the trim plates 1110 may be mounted on the shaft 1108 (or shaft segments 1108*a* and 1108*b*) for selective or controlled rotation about the axis of the shaft 1108. In such embodiments, the first surface area (or main wind opposing surface) of each of the trim plates 1110 may be rotated to a position or state in which the plane of the surface is about 90 degrees relative to the direction of the wind (or to the plane of the top surface of the container 250), such as shown in FIG. 12A. In this case, the main wind opposing surface of each of the trim plates 1110 is perpendicular or substantially perpendicular to the direction of the wind, to receive a maximum force from the wind (or provide "full drag"). Such configuration shown in FIG. 12A may help to reduce flutter, for example, when a ship or vessel is moored.

In further examples, the first surface area (or main wind opposing surface) of each of the trim plates 1110 may be rotated to a position or state in which the plane of the surface is about 0 degrees (or 180 degrees) relative to the direction of the wind (or to the plane of the top surface of the container 250), as shown in FIG. 12C. In this case, the main wind opposing surface of each of the trim plates 1110 is parallel or substantially parallel to the direction of the wind, to receive no or minimal force from the wind (or "minimal drag"). In some examples, the wing sail 1102 may "feather" (e.g., freely pivot or rotate) corresponding to the direction of the wind.

In some embodiments, the main wind opposing surface of each of the trim plates 1110 may be rotated 45 degrees (or 225 degrees) relative to the top surface of the container 250, as shown in FIG. 12B. In this case, some of the surface area of the main wind opposing surface of each of the trim plates 1110 oppose the wind forces, and thus, the wind apply a "partial drag." Other embodiments may include any suitable number of third (or intermediate) positions, where the trim plates 1110 are rotated, for example, more than 0 degrees and less than 90 degrees, such that only some of the surface area of the main wind opposing surface of the trim plates 1110 oppose the direction of the wind. For example, in some embodiments, a 15 degree rotation angle of the main wind opposing surface of the trim plates 1110 relative to the top surface of the container 250 may provide about 15 percent of the "normal" AOA of the wingsail 1102, and may produce about 15 percent of the "normal" power (e.g., compared to the 90 degree rotation providing "full" or 100 percent AOA and "full" or 100 percent power).

Any suitable mechanisms and methods of rotating the trim plates 1110 may be employed in embodiments described herein. For example, in certain embodiments, the shaft 1108 (or shaft segments 1108*a* and 1108*b*) may be supported for rotation about its axis, and the trim plates 1110 may be attached to the shaft 1108 (or shaft segments 1108*a* and 1108*b*) in a fixed relation to rotate with the shaft 1108 (or shaft segments 1108*a* and 1108*b*). In other embodiments, the shaft 1108 (or shaft segments 1108*a* and 1108*b*) may be fixed in the rotary direction, while the trim plates 1110 are secured to the shaft 1108 (or shaft segments 1108*a* and 1108*b*) for rotation about the shaft 1108 (or shaft segments 1108*a* and 1108*b*).

In certain embodiments, the trim plates 1110 may be mounted and configured to be rotated manually, by hand, between the first position or state and the second position or state. In other embodiments, the orientation of the trim plates between positions or states may be motor-driven (e.g., by one or more motors or rotation actuators connected to the shaft 1108 or the trim plates 1110). The motor may be included in or represented by the motor assembly 104 in FIGS. 1A and 1B, or may be one or more separate motors (not shown) on or associated with the trim plates 1110 or shaft 1108, and may be connected to the trim plates 1110 or the shaft 1108 (or shaft sections 1108*a* and 1108*b*) by suitable linkage (not shown). In various embodiments, the rotation of the trim plates 1110 or the shaft 1108 (or shaft sections 1108*a* or 1108*b*) may be user controlled (e.g., via user commands input into a controller through any suitable input device such as, but not limited to the user input 110, computer 112 or tablet 114 in FIGS. 1A and 1B). The controller may be included in or represented by the computer 112, the tablet 114, or the processor 104C in FIG. 1A or 1B, or other suitable processor. Alternatively, or in addition, the rotation of the trim plates 1110 or the shaft 1108 (or shaft sections 1108*a* or 1108*b*) may be controlled in response to sensor signals provided to the controller from one or more sensors (such as, but not limited to the wind sensor 306) configured to detect or sense a direction and/or strength of the wind. For example, in various embodiments, the controller and/or sensors may be coupled to a motor assembly used to rotate the shaft 1108 (or shaft sections 1108*a* and 1108*b* separately or together) and/or the trim plates 1110 (individually or together), and may control the orientations of the trim plates 1110 to help set the AOA of the wingsail 1102 relative to the wind. In other embodiments, instead of (or in addition to) rotating the trim plates 1110 to transition between the various positions, the trim plates 1110 (or the main wind opposing surface thereof) may be configured to open and close (or expand and retract) to transition between the various positions, as will be discussed in more detail below with reference to FIGS. 14-15.

FIG. 13A shows a front sectional view of the wingsail 1102 of FIG. 11, according to various embodiments, and FIG. 13B shows a top view of the wingsail 1102 of FIG. 11, according to various embodiments. The trim plates 1110 may be used to control or steer the wingsail 1102 to set the AOA of the wingsail 1102 relative to the wind. For example, in various embodiments, each of the trim plates 1110 may be controlled (e.g., rotated, opened/closed, or the like) to transition from any of the first, second, and third positions, so that when the trim plates 1110 are exposed to wind, a steering force F1 is generated to control (or steer) the rotation of the wingsail 1102 about the longitudinal axis 1114 of the wing axle 1112. In some embodiments, the steering force F1 generated by the trim plates 1110 and relative wind forces balances (or trims) a lift force F2 that is used to provide at least partial thrust to propel a vessel or vehicle forward.

For example, as shown in the non-limiting example of FIG. 13A, the trim plates 1110 may include a first trim plate 1110*a* configured on one side of the wing body 1104 (e.g., on the left side of FIG. 13A), and a second trim plate 1110*b* configured on an opposite side of the wing body 1104 (e.g., on the right side of FIG. 13A). The first trim plate 1110*a* is shown in the first position (e.g., the open position) and the second trim plate 1110*b* is shown in the second position (e.g., the closed position). In this case, when relative wind forces are applied in a direction from the front of the wing body 1104 towards the back of the wind body 1104, the wind opposing surface of the first trim plate 1110*a* in the first position (or open position) opposes or "catches" the wind forces, while the second trim plate 1110*b* in the second position (or closed position) does not oppose or minimally opposes the relative wind forces. Accordingly, a rotational steering force F1 is generated to rotate the wing body 1104 about the wing axle 1112 such that a tail or rear end of the wing body 1104 rotates or swings corresponding to the steering force F1.

For example, as shown in FIG. 13B, the first position (or open position) of the wind opposing surface of the first trim plate 1110a configured on one side of the wing body 1104 fully opposes the relative wind forces, while the second position (or closed position) of the wind opposing surface of the second trim plate 1110b configured on an opposite side of the wing body 1104 does not oppose (or minimally opposes) the relative wind forces. Accordingly, a steering force F1 is generated to rotate or swing the wing body 1104 in a direction (e.g., a clock-wise direction in FIG. 13B) towards the opposite side of the wing body 1104 on which the second trim plate 1110b is supported in the second position (or closed position). On the other hand, if the second trim plate 1110b is configured in the first position (or open position) and the first trim plate 1110a is configured in the second position (or closed position), a steering force in a direction opposite of F1 would be generated by the relative wind forces acting on the second trim plate 1110b to rotate or swing the wing body 1104 in a direction (e.g., a counter-clock-wise direction in FIG. 13B) towards the one side of the wing body 1104 on which the first trim plate 1110a is supported in the second position (or closed position). Accordingly, in some embodiments, the rotation of the wing body 1104 about the wing axle 1112 may be controlled by the trim plates 1110a and 1110b generating drag relative to the wind forces alone, without requiring an additional power source (e.g., electrical power source) to control the pivoting (or rotational) movement of the wing body 1104 about the wing axle 1112.

Still referring to FIG. 13B, in some embodiments, when the steering force F1 is generated corresponding to the drag generated by the wind forces acting on a trim plate oriented in the first position or state, a corresponding lift force F2 is generated in an opposite direction of the steering force F1 towards the trim plate configured in the first position that produces drag. Thus, the steering force F1 can be generated to control or balance an amount of the corresponding lift force F2 that is generated, such that the AOA of the wingsail 1102 can be set relative to the wind to provide thrust to the vehicle or vessel on which the wingsail 1102 is mounted. For example, in the configuration shown in FIG. 13B, when the relative wind forces act on the first trim plate 1110a oriented in the first position (or open position) to generate the steering force F1, a corresponding lift force F2 is generated towards the same side of the wing body 1104 having the first trim plate 1110a configured in the first position (or opened position). Thus, the lift force F2 may provide thrust to help propel the vehicle or vessel. For example, in some embodiments, a 22% chord steering force F1 can generate a corresponding 25% chord lift force F2. Accordingly, the AOA of the wingsail 1102 relative to the wind can be set by steering the wingsail 1102 using the trim plates 1110a and 1110b to generate thrust in a desired direction corresponding to the lift force F2.

In some embodiments, the lift force F2 may be proportional to an area of the wind opposing surface of the trim plate (e.g., the opened trim plate) multiplied by the distance of the trim plate from the side surface of the wing body 1104 (e.g., the length of the shaft 1108). Accordingly, in various embodiments, the wind opposing surface of the trim plates 1110 may be suitably sized according to the length of the shaft 1108, the location of the trim plate 1110 along the length of the shaft, and a desired amount of lift force F2. In other embodiments, the area of the wind opposing surface of the trim plates 1110 may correspond to an area of a surface of the wing body 1104. In some embodiments, the distance of the trim plate 1110 from the surface of the wing body 1104 may be controlled, as will be discussed below with reference to FIGS. 16-17.

While FIGS. 13A and 13B show an example of the trim plates 1110a and 1110b in a first position or state (e.g., an open position) and a second position or state (e.g., a closed position), it should be appreciated that each of the trim plates 1110a and 1110b may be configured to transition in any of the first, the second, and/or one or more third positions described herein. For example, in some embodiments, the amount or direction of the steering force F1 may be controlled by reducing drag on one trim plate (e.g., by transitioning from the first position to one of the third positions), or by increasing the drag on another trim plate (e.g., by transitioning from the second position to one of the third positions). In this case, the amount of steering force F1 generated may be reduced (or trimmed), thereby reducing (or trimming) the corresponding amount of the generated lift force F2. In other embodiments, each of the trim plates 1110a and 1110b may be configured to transition between only two positions (e.g., a maximum or partially open position and a minimum or partially closed position).

Figure 14A:
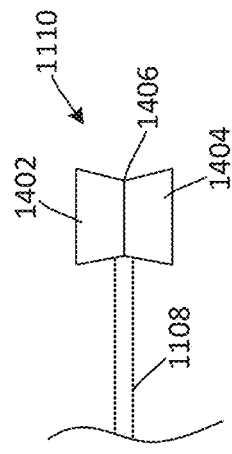
FIGS. 14A and 14B show examples of a trim plate in various positions or states, according to various embodiments.
Figure 15A:
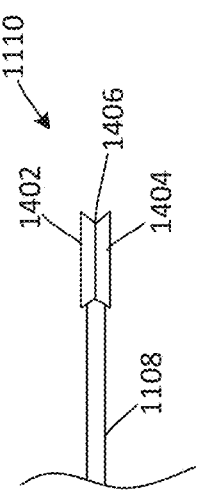
FIGS. 15A and 15B show examples of a trim plate in various positions or states, according to various embodiments.
Figure 14B:
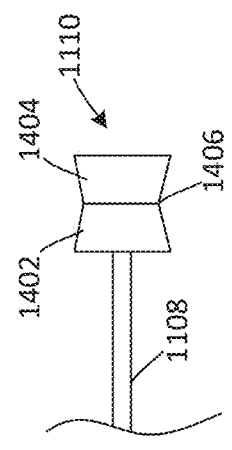
Figure 15B:
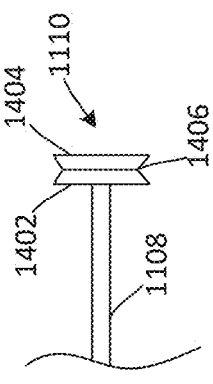

FIGS. 14A through 15B show examples of a trim plate 1110 in various positions or states, according to various embodiments. In some embodiments, instead of (or in addition to) rotating the trim plates 1110, the trim plates 1110 may be configured to open or close to transition between various positions or states and adjust an amount of drag generated by the trim plates 1110. For example, in some embodiments, the trim plate 1110 may include a first wind opposing surface portion 1402, a second wind opposing surface portion 1404, and a hinge 1406 connecting the first and second surface portions 1402 and 1404 together. Accordingly, the first and second surface portions 1402 and 1404 may pivot relative to the hinge 1406 to be folded together, in order to adjust an amount of drag provided by the trim plate 1110. For example, as shown in FIGS. 14A and 15A, in a first position, the trim plate 1110 may be fully opened to provide maximum force or drag. On the other hand, as shown in FIGS. 14B and 15B, in a second position, the trim plate 1110 may be fully closed to provide no (or minimal) force or drag. In addition, in some embodiments, the trim plate 1110 may be partially opened in one or more third positions (intermediate positions), between the first and second positions, to provide partial power or drag.

As shown in FIGS. 14A and 14B, in some embodiments, the hinge 1406 may extend vertically across the trim plate 1110, or as shown in FIGS. 15A and 15B, the hinge 1406 may extend horizontally across the trim plate 1110. In other embodiments, the hinge 1406 may extend diagonally across the trim plate 1110 or in any suitable direction. In still other embodiments, the hinge 1406 may connect the trim plate 1110 to the shaft 1108 such that the trim plate 1110 can rotate about the shaft 1108 via the hinge 1406. In other embodiments, the trim plate 1110 may include more than two surface portions, such as one or more additional surface portions connected with one or both surface portions 1402 and 1404 by one or more additional hinges. In yet other embodiments, the trim plates 1110 may have other suitable configurations for transitioning between a first position or state (for maximizing force or drag) and a second position or state (for minimizing force or drag), such as, but not limited to trim plates configured for selectively expanding or inflating to the first position or state and compressing or deflating to the second position or state with gas or fluid pressure, or configured for selectively extending to the first position or state and retracting to the second position or state. Other embodiments of trim plates may be configured to selectively transition between first and second positions or states by rolling and unrolling, fanning and unfanning, telescoping out or in, or the like.

In various embodiments, the trim plates 1110 may be opened/closed manually, or may be motor-driven and controlled by a controller, as discussed above with regard to moving the trim plates 1110 in FIGS. 11-13B between first and second positions or states. For example, in some embodiments, at least one of the surface portions 1402 and 1404 may be attached to a telescoping hydraulic cylinder such that when pressurized, the hydraulic cylinder expands in length and pivots the surface portions 1402 and 1404 to fold toward each other toward the closed position as shown in FIGS. 14B and 15B, and when unpressurized, the hydraulic cylinder retracts in length to allow the surface portions 1402 and 1404 to pivot apart to the open position as shown in FIGS. 14A and 15A, by a force of a spring (not shown), gravity, manual pressure, or motor. In other embodiments, a hydraulic cylinder may be configured to expand when pressurized to pivot the surface portions 1402 and 1404 apart and unfold the trim plate toward the open position as shown in FIGS. 14A and 15A, and to retract when unpressurized toward the closed position shown in FIGS. 14B and 15B. In other examples, the surface portions 1402 and 1404 may be coupled through suitable linkage to a motor for driving the surface portions between pivot positions (as discussed above with regard to the motor moving the trim plates 1110 in FIGS. 11-13B). For example, in various embodiments, a controller and/or sensors as discussed above may be coupled to a motor assembly to selectively open and close the trim plate 1110, and may dictate the orientations of the trim plates 1110 to set the AOA of the wingsail 1102 relative to the wind.

Figure 16A:
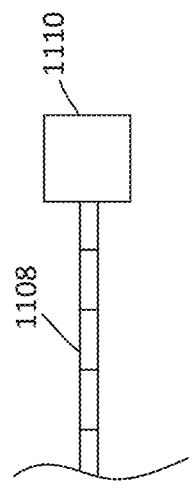
FIGS. 16A and 16B show examples of adjusting a distance of a trim plate from the surface of a wing body, according to various embodiments.

FIGS. 16A through 17B show example configurations for controlling a distance of the trim plate 1110 from the surface of the wing body 1104, according to various embodiments. As discussed above, in some embodiments, the lift force F2 may be proportional to an area of the wind opposing surface of the trim plate 1110 (e.g., the opened trim plate) multiplied by the distance of the trim plate 1110 from the side surface of the wing body 1104 (e.g., the length of the shaft 1108). Accordingly, in some embodiments, the distance of the trim plate 1110 from the side surface of the wing body 1104 may be controlled (or adjusted) to enable more controllable adjustments to the lift force F2 as needed or desired. In various embodiments, the distance of the trim plate 1110 from the surface of the wing body 1104 may be adjusted using any suitable adjustable support structure or methods, for example, such as a slidable coupling structure on the trim plate 1110 for coupling the trim plate 1110 to the shaft 1108 for sliding movement along a length of the shaft 1108 (e.g., as shown in FIGS. 16A and 16B).

Figure 17A:
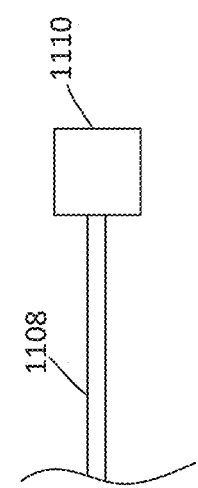
FIGS. 17A and 17B show examples of adjusting a distance of a trim plate from the surface of a wing body, according to various embodiments.
Figure 17B:
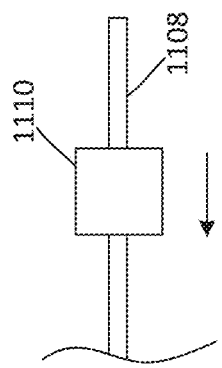

In other examples, the shaft 1108 has two or more telescoping sections, and the distance of the trim plate 1110 from the surface of the wing body 1104 is adjusted by expanding or compressing telescoping sections of the shaft 1108 (e.g., as shown in FIGS. 17A and 17B). However, the present disclosure is not limited thereto, and other suitable methods of adjusting the distance of the trim plate 1110 from the wing body 1104 are contemplated, for example, such as folding/unfolding the shaft 1108 from the wing body 1104 (such as, but not limited to an accordion-like, or a fan-like support structure) or inflating or deflating the shaft 1108.

Figure 16B:
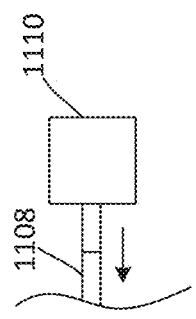

For example, referring to FIGS. 16A and 16B, in some embodiments, the distance between the trim plate 1110 and the surface of the wing body 1104 may be controlled by sliding the trim plate 1108 along a length of the shaft 1108. For example, in some embodiments, the shaft 1108 may extend through an aperture in the trim plate 1110 (or in a clip on a back side of the trim plate), where the aperture is sized such that the trim plate 1110 (or clip) is slidable along the length of the shaft but frictionally engages the shaft 1108 with sufficient friction force to maintain the trim plate 1110 (or clip) in any one of multiple possible positions along the length of the shaft 1108. In other embodiments, the shaft 1108 may have a rail extending along its length, and the trim plate 1110 may have a corresponding clip or mount to slide along the rail. In various embodiments, the trim plates 1110 may slide along the length of the shaft 1108 via a manual force, or via a motor-driven cable pulling device, for example. In various embodiments, the sliding of the trim plate 1110 along the length of the shaft 1108 may be user controlled (e.g., via user commands input into a controller) and/or controlled via one or more sensors (e.g., the wind sensor 306) configured to detect or sense a direction and/or strength of the wind. For example, in various embodiments, the controller and/or sensors may be coupled to a motor assembly used to slide the trim plate 1110 along the length of the shaft 1108, and may dictate the desired distance of the trim plates 1110 from the surface of the wing body 1104 needed to set the AOA of the wingsail 1102 relative to the wind.

Referring to examples shown in FIGS. 17A and 17B, in some embodiments, the distance between the trim plate 1110 and the surface of the wing body 1104 may be controlled by telescopically adjusting the length of the shaft 1108. For example, in some embodiments, the shaft 1108 may have various portions along its length, such that one or more (or each) portion is configured to be received in or to house an adjacent portion when the shaft 1108 is compressed. On the other hand, when the shaft 1108 is extended, one or more (or each) portion is configured to slide out of or over a corresponding adjacent portion such that the shaft 1108 is telescopically extended. In various embodiments, the length of the shaft 1108 may be adjusted via a manual force, or via a motor-driven actuator, for example. In various embodiments, the extending/compressing of the shaft 1108 may be user controlled (e.g., via user commands input into a controller) and/or controlled via one or more sensors (e.g., the wind sensor 306) configured to detect or sense a direction and/or strength of the wind. For example, in various embodiments, the controller and/or sensors may be coupled to a motor assembly used to compress or extend the shaft 1108, and may dictate the desired length of the shaft to set the desired distance of the trim plates 1110 from the surface of the wing body 1104 needed to set the AOA of the wingsail 1102 relative to the wind.

The above used terms, including "attached," "connected," "secured," and the like are used interchangeably. In addition, while certain embodiments have been described to include a first element as being "coupled" (or "attached," "connected," "fastened," etc.) to a second element, the first element may be directly coupled to the second element or may be indirectly coupled to the second element via a third element.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

What is claimed is:

1. A wingsail comprising:
   a wing body configured to be supported for rotation about a first axis;
   and
   at least one trim plate supported on at least one side of the wing body, the trim plate configured to control a rotational movement of the wing body about the first axis;
   wherein the at least one trim plate is configured to rotate or pivot about a second axis between at least a first position and a second position to adjust an amount of wind force applied to the trim plate, the second axis being transverse to the first axis.

2. The wingsail of claim 1, wherein the at least one trim plate is configured to rotate or pivot between at least a first position and a second position to adjust the amount of wind force applied to the trim plate.

3. The wingsail of claim 2, wherein the trim plate comprises:
   a hinge; and
   a wind opposing surface configured to pivot about the hinge to transition between the first position and the second position.

4. The wingsail of claim 1, wherein the wing body has two sides with one or more surfaces configured to provide a lift force in wind, the wingsail further comprising a support structure extending from at least one of the sides of the wing body to support the trim plate on the at least one side of the wing body.

5. The wingsail of claim 4, wherein the support structure extends from the at least one side surface of the wing body and positions each trim plate a distance away from the side surface of the wing body.

6. A wingsail comprising:
   a wing body;
   a wing axle having an axis;
   at least one trim plate supported on a side surface of the wing body, the trim plate configured to control a rotational movement of the wing body about the axis of the wing axle; and
   a shaft to support the trim plat on the side surface of the wing body;
   wherein the shaft extends the trim plate away from the side surface of the wing body; and
   wherein the shaft extends perpendicularly from the side surface of the wing body.

7. A wingsail comprising:
   a wing body;
   a wing axle having an axis;
   at least one trim plate supported on a side surface of the wing body, the trim plate configured to control a rotational movement of the wing body about the axis of the wing axle; and
   a shaft to support the trim plat on the side surface of the wing body;
   wherein the shaft is configured to telescopically extend to control a distance between the trim plate and the side surface of the wing body.

8. A wingsail comprising:
   a wing body;
   a wing axle having an axis;
   at least one trim plate supported on a side surface of the wing body, the trim plate configured to control a rotational movement of the wing body about the axis of the wing axle; and
   a shaft to support the trim plat on the side surface of the wing body;
   wherein the shaft includes a length, and the trim plate is configured to slide along the length of the shaft to control a distance between the trim plate and the side surface of the wing body.

9. The wingsail of claim 1, wherein the at least one trim plate comprises a first trim plate supported by the support structure on one side of the wing body and a second trim plate supported on an opposite side of the wing body.

10. The wingsail of claim 9, wherein each of the first trim plate and the second trim plate is configured to rotate or pivot between at least a first position and a second position to control a steering force of the wing body about the first axis.

11. The wingsail of claim 10, wherein the steering force trims a lift force to provide thrust in the direction of the lift force.

12. A method of steering a wingsail, the method comprising:
    installing a wingsail on a surface of a container or vessel, the wingsail comprising:
       a wing body;
       a wing axle having a first axis; and
       at least one trim plate supported on a side surface of the wing body;
    extending the at least one trim plate into relative wind forces; and
    adjusting a position of the at least one trim plate by rotating or pivoting the at least one trim plate about a second axis to control a rotational movement of the wing body about the first axis of the wing axle;

wherein the at least one trim plate is configured to rotate or pivot about a second axis between at least a first position and a second position to adjust an amount of wind forces applied to the trim plate, the second axis being transverse to the first axis.

13. The method of claim 12, wherein the adjusting of the position of the at least one trim plate comprises rotating the at least one trim plate between at least a first position and a second position to control an amount of the wind forces applied to a wind opposing surface of the trim plate.

14. The method of claim 12, wherein the adjusting of the position of the trim plate comprises pivoting a wind opposing surface of the trim plate about a hinge to open or close the wind opposing surface to the relative wind forces.

15. The method of claim 12, further comprising:
providing a shaft on the side surface of the wing body; and
attaching the trim plate to the shaft.

16. A method of steering a wingsail, the method comprising:
installing a wingsail on a surface of a container or vessel, the wingsail comprising:
a wing body;
a wing axle having an axis; and
at least one trim plate supported on a side surface of the wing body;
extending the at least one trim plate into relative wind forces;
adjusting a position of the at least one trim plate to control a rotational movement of the wing body about the axis of the wing axle;
providing a shaft on the side surface of the wing body; and
attaching the trim plate to the shaft;
wherein the extending of the at least one trim plate into relative wind forces comprises:
attaching the at least one trim plate to an end of the shaft; and
telescopically extending the shaft from the side surface of the wing body.

17. A method of steering a wingsail, the method comprising:
installing a wingsail on a surface of a container or vessel, the wingsail comprising:
a wing body;
a wing axle having an axis; and
at least one trim plate supported on a side surface of the wing body;
extending the at least one trim plate into relative wind forces;
adjusting a position of the at least one trim plate to control a rotational movement of the wing body about the axis of the wing axle;
providing a shaft on the side surface of the wing body; and
attaching the trim plate to the shaft;
wherein the extending of the at least one trim plate into relative wind forces comprises:
sliding the at least one trim plate along a length of the shaft.

18. The method of claim 12, wherein the trim plate includes a first trim plate supported on the side surface of the wing body, and a second trim plate supported on an opposite side surface of the wing body, and the method further includes:
adjusting a position of each of the first and second trim plates such that the first trim plate generates drag relative to the relative wind forces and the second trim plate does not generate drag relative to the relative wind forces,
wherein, in response, a steering force is generated to rotate the wingsail about the wing axle.

19. The method of claim 18, wherein the steering force trims a corresponding lift force to provide thrust in the direction of the lift force.

20. A wingsail comprising:
a wing body;
a wing axle having an axis; and
at least one trim plate supported on a side surface of the wing body, the trim plate configured to control a rotational movement of the wing body about the axis of the wing axle;
wherein the at least one trim plate is secured to the support structure and movable to adjust its distance from the at least one side of the wing body.

21. A wingsail comprising:
a wing body;
a wing axle having an axis; and
at least one trim plate supported on a side surface of the wing body, the trim plate configured to control a rotational movement of the wing body about the axis of the wing axle;
wherein the wing body has a front end and a tail end that generally align with a wind direction when the wing body provides the lift force, and wherein the trim plate is located between the front end and the tail end of the wing body and laterally spaced from a side surface of the wing body.

22. The wingsail of claim 1, wherein the wing body has two sides with one or more surfaces configured to provide a lift force in wind wherein the two sides of the wing body extend from a front end to a tail end of the wing body, and wherein each trim plate is located between the front end and the tail end of the wing body and laterally spaced from one of the side surfaces of the wing body.

23. The wingsail of claim 1, wherein the second axis is perpendicular to the first axis.

* * * * *